(12) United States Patent
Lee et al.

(10) Patent No.: US 8,654,271 B2
(45) Date of Patent: Feb. 18, 2014

(54) LIQUID CRYSTAL DISPLAY

(75) Inventors: Yun-Seok Lee, Cheonan-si (KR); Young-Je Cho, Cheonan-si (KR)

(73) Assignee: Samsung Display Co., Ltd. (KR)

( * ) Notice: Subject to any disclaimer, the term of this patent is extended or adjusted under 35 U.S.C. 154(b) by 912 days.

(21) Appl. No.: 12/577,693

(22) Filed: Oct. 12, 2009

(65) Prior Publication Data

US 2010/0231819 A1 Sep. 16, 2010

(30) Foreign Application Priority Data

Mar. 10, 2009 (KR) ........................ 10-2009-0020450

(51) Int. Cl.
*G02F 1/361* (2006.01)
*G02F 1/1343* (2006.01)

(52) U.S. Cl.
USPC ................................ 349/43; 349/38; 349/144

(58) Field of Classification Search
USPC ..................... 349/38, 39, 43, 129, 130, 144
See application file for complete search history.

(56) References Cited

U.S. PATENT DOCUMENTS

2005/0036091 A1* 2/2005 Song .............................. 349/129
2008/0297675 A1* 12/2008 Kim ................................ 349/38

FOREIGN PATENT DOCUMENTS

| JP | 2006-039567 A | 2/2006 |
|---|---|---|
| JP | 2006-276411 A | 10/2006 |
| JP | 2006-310636 A | 11/2006 |
| JP | 2006-330609 A | 12/2006 |
| JP | 2007-140521 A | 6/2007 |

* cited by examiner

*Primary Examiner* — Edward Glick
*Assistant Examiner* — David Chung
(74) *Attorney, Agent, or Firm* — Innovation Counsel LLP

(57) ABSTRACT

Embodiments of the present invention relate to a liquid crystal display. According to an embodiment, a liquid crystal display including a plurality of pixels arranged in a matrix according to an exemplary embodiment of the present invention includes: a plurality of pixel electrodes respectively including a first sub-pixel electrode and a second sub-pixel electrode; a plurality of first thin film transistors connected to the first sub-pixel electrodes; a plurality of second thin film transistors connected to the second sub-pixel electrodes; a plurality of third thin film transistors connected to the second sub-pixel electrodes; a plurality of first gate lines connected to the first and second thin film transistors; a plurality of data lines connected to the first and second thin film transistors; a plurality of second gate lines connected to the third thin film transistors; and a step-down capacitor connected between the drain electrode of the third thin film transistor and the first gate line.

20 Claims, 14 Drawing Sheets

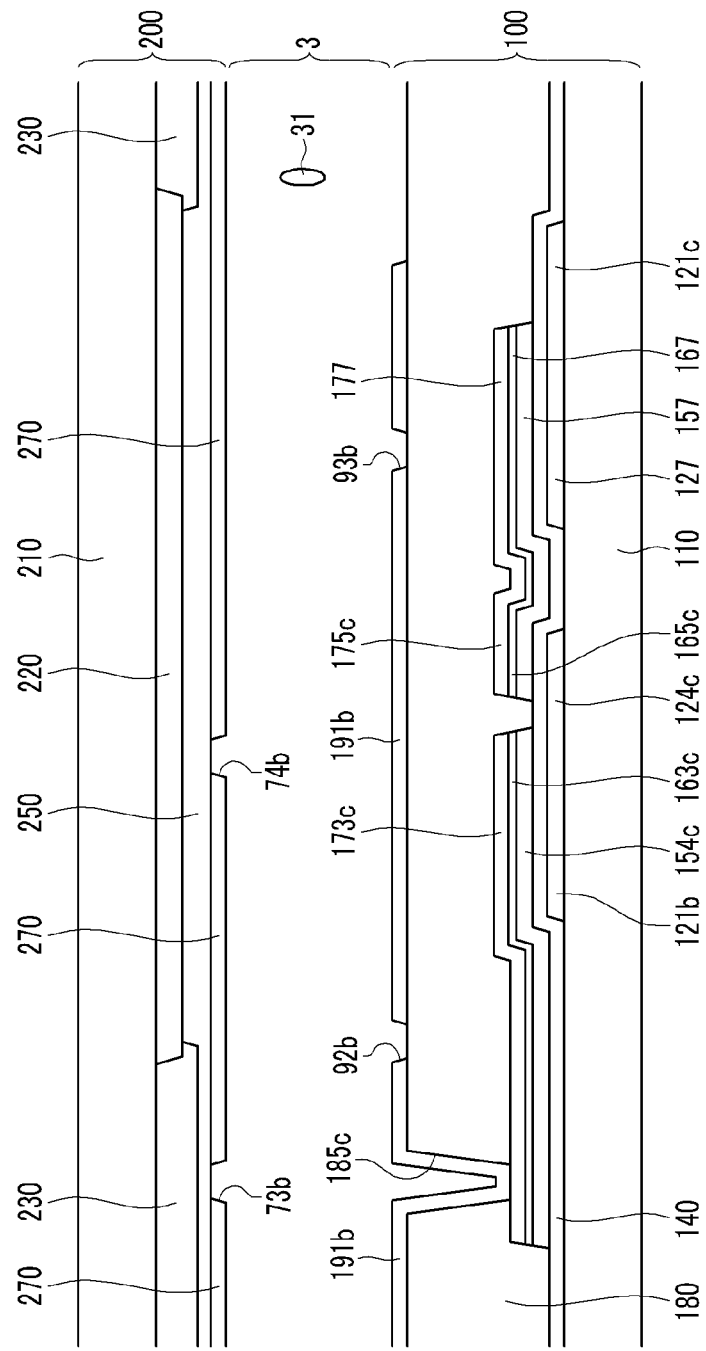

LIQUID CRYSTAL DISPLAY

CROSS-REFERENCE TO RELATED APPLICATION

This application claims priority to and the benefit of Korean Patent Application No. 10-2009-0020450 filed in the Korean Intellectual Property Office on Mar. 10, 2009, the entire contents of which are incorporated herein by reference.

BACKGROUND (a) Technical Field

Embodiments of the present invention generally relate to a liquid crystal display.

(b) Description of the Related Art

Liquid crystal displays are now widely used as one type of flat panel display. A liquid crystal display has two display panels on which field generating electrodes such as pixel electrodes and a common electrode are formed, and a liquid crystal layer that is interposed between the panels. Voltages are applied to the field generating electrodes so as to generate an electric field over the liquid crystal layer, and the alignment of liquid crystal molecules of the liquid crystal layer is determined by the electric field. Accordingly, the polarization of incident light is controlled, thereby performing image display.

The liquid crystal display further has thin film transistors connected to pixel electrodes, respectively, and a plurality of signal lines such as gate lines and data lines for controlling them.

Among the LCDs, a vertical alignment (VA) mode LCD, which aligns LC molecules such that their long axes are perpendicular to the panels in the absence of an electric field, is spotlighted because of its high contrast ratio and wide reference viewing angle. Here, the reference viewing angle implies a viewing angle that is 1:10 in contrast ratio, or a critical angle of gray-to-gray luminance reversion.

In order to approximate side visibility to front visibility in the vertical alignment mode LCD, a method of causing a difference in transmittance by dividing one pixel into two sub-pixels and applying different voltages to the two sub-pixels has been suggested.

An example of the method includes applying the same voltage to two sub-pixels and dropping the voltage of one sub-pixel by using a separate switching element. However, when employing this method, since the LCD should be provided with a plurality of signal lines and a plurality of contact holes, the aperture ratio is low.

The above information disclosed in this Background section is only for enhancement of understanding of the background of the disclosure and therefore it may contain information that does not form the prior art that is already known in this country to a person of ordinary skill in the art.

SUMMARY

Embodiments of the present invention provide an LCD for differently adjusting voltages of two sub-pixels while ensuring a sufficient aperture ratio.

A liquid crystal display including a plurality of pixels arranged in a matrix according to an exemplary embodiment of the present invention includes: a plurality of pixel electrodes respectively including a first sub-pixel electrode and a second sub-pixel electrode; a plurality of first thin film transistors connected to the first sub-pixel electrodes; a plurality of second thin film transistors connected to the second sub-pixel electrodes; a plurality of third thin film transistors connected to the second sub-pixel electrodes; a plurality of first gate lines connected to the first and second thin film transistors; a plurality of data lines connected to the first and second thin film transistors; a plurality of second gate lines connected to the third thin film transistors; and a step-down capacitor connected between the drain electrode of the third thin film transistor and the first gate line.

The step-down capacitor may be formed by overlapping the first gate line and the electrode member via the first insulating layer, and the electrode member may be formed with the same layer as the data line.

The electrode member may be connected to the drain electrode of the third thin film transistor.

The step-down capacitor may further include a semiconductor layer disposed under the electrode member, and the electrode member may have substantially the same plane shape as the semiconductor layer.

A second insulating layer formed between the first, second, and third thin film transistors, and the first and second sub-pixel electrodes, may further be included, the second insulating layer may have a first contact hole to connect the first thin film transistor to the first pixel electrode and a second contact hole to connect the second thin film transistor to the second pixel electrode, and the first contact hole may be disposed in a region enclosed by the source electrode of the first thin film transistor and the second contact hole may be disposed in the region enclosed by the source electrode of the second thin film transistor.

The step-down capacitor may be formed by overlapping the first gate line and the electrode member via the insulating layer, and the electrode member may be formed with the same layer as the pixel electrode.

Semiconductor layers formed under the first thin film transistor, the second thin film transistor, the drain electrode of the third thin film transistor, and the data line may be further included, and the semiconductor layers have substantially the same plane shape as the first thin film transistor, the second thin film transistor, the drain electrode of the third thin film transistor, and the data line except for the channel of the first, second, and third thin film transistors.

The insulating layer may have a contact hole, and the electrode member may be connected to the drain electrode of the third thin film transistor through the contact hole.

The first sub-pixel electrode and the second sub-pixel electrode may be adjacent to each other according to the pixel column of the pixels.

A liquid crystal display including a plurality of pixels arranged in a matrix according to another exemplary embodiment of the present invention includes: a plurality of pixel electrodes respectively including a first sub-pixel electrode and a second sub-pixel electrode; a plurality of first thin film transistors connected to the first sub-pixel electrodes; a plurality of second thin film transistors connected to the second sub-pixel electrodes; a plurality of third thin film transistors connected to the second sub-pixel electrodes; a plurality of first gate lines connected to the first and second thin film transistors; a plurality of data lines connected to the first and second thin film transistors; a plurality of second gate lines connected to the third thin film transistors; and a step-down capacitor connected between the drain electrode of the third thin film transistor and the third gate line.

The step-down capacitor may be formed by overlapping the third gate line and the electrode member via the first insulating layer, and the electrode member may be formed with the same layer as the data line.

The step-down capacitor may be formed by overlapping the third gate line and the electrode member via the first insulating layer, and the electrode member may be formed with the same layer as the pixel electrode.

The second sub-pixel electrode may enclose the first sub-pixel electrode.

The area of the first sub-pixel electrode may be smaller than the area of the second sub-pixel electrode.

A common electrode facing the pixel electrode may be further included, at least one of the first sub-pixel electrode and the second sub-pixel electrode may have a first cutout, and the common electrode may have a second cutout.

Accordingly, the voltages of two sub-pixels are differently controlled, thereby obtaining the aperture ratio.

BRIEF DESCRIPTION OF THE DRAWINGS

FIG. 14 is a cross-sectional view taken along line XIV-XIV in the liquid crystal display of FIG. 13.

DETAILED DESCRIPTION

Figure 1:
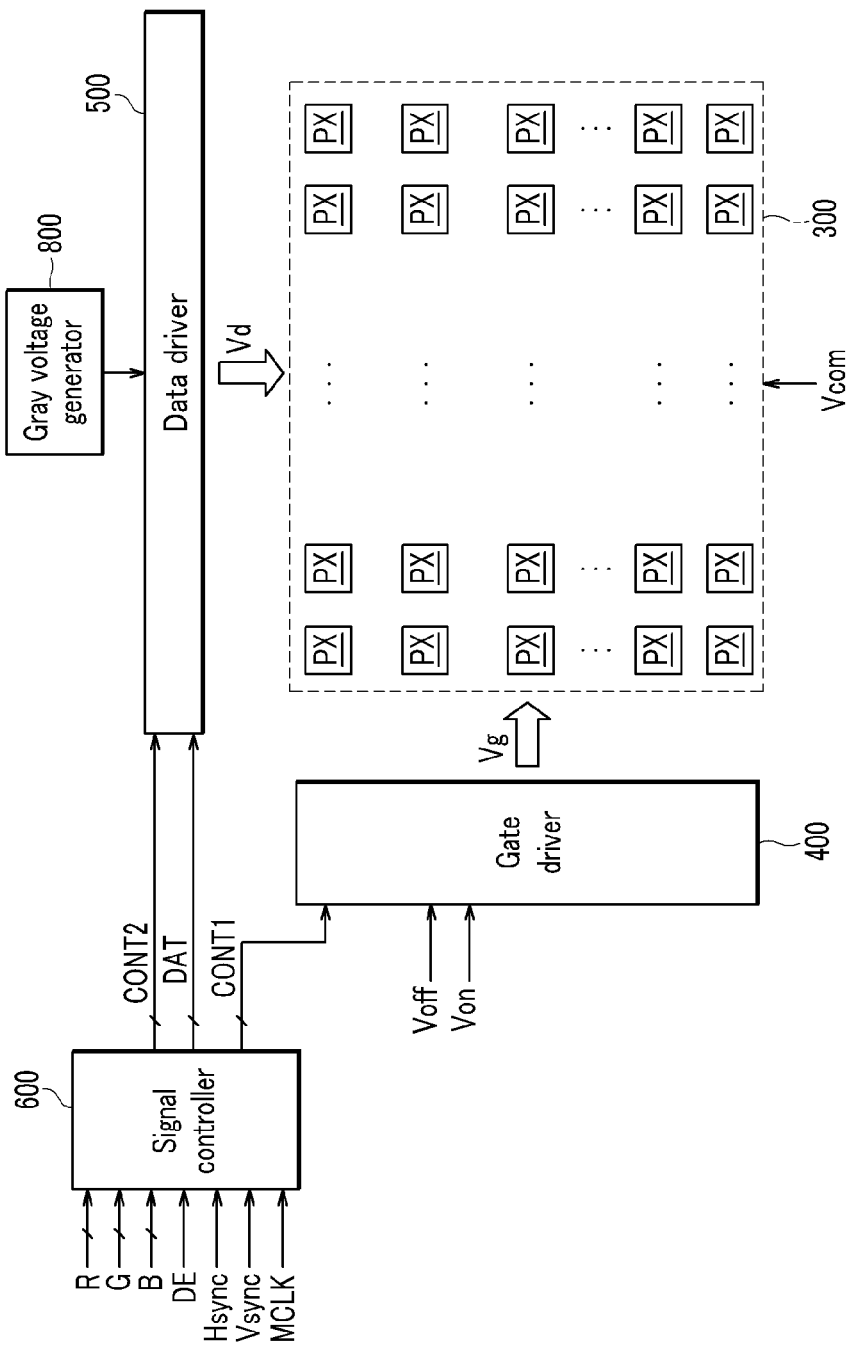
FIG. 1 is a block diagram of an LCD according to one exemplary embodiment of the present invention.

The present disclosure will be described more fully hereinafter with reference to the accompanying drawings, in which exemplary embodiments of the invention are shown. As those skilled in the art would realize, the described embodiments may be modified in various different ways, all without departing from the spirit or scope of the present disclosure.

In the drawings, the thickness of layers, films, panels, regions, etc., are exaggerated for clarity. Like reference numerals designate like elements throughout the specification. It will be understood that when an element such as a layer, film, region, or substrate is referred to as being "on" another element, it can be directly on the other element, or intervening elements may also be present. In contrast, when an element is referred to as being "directly on" another element, there are no intervening elements present.

An LCD according to one exemplary embodiment of the present invention will be described more fully herein with reference to FIG. 1 to FIG. 3.

Figure 2:
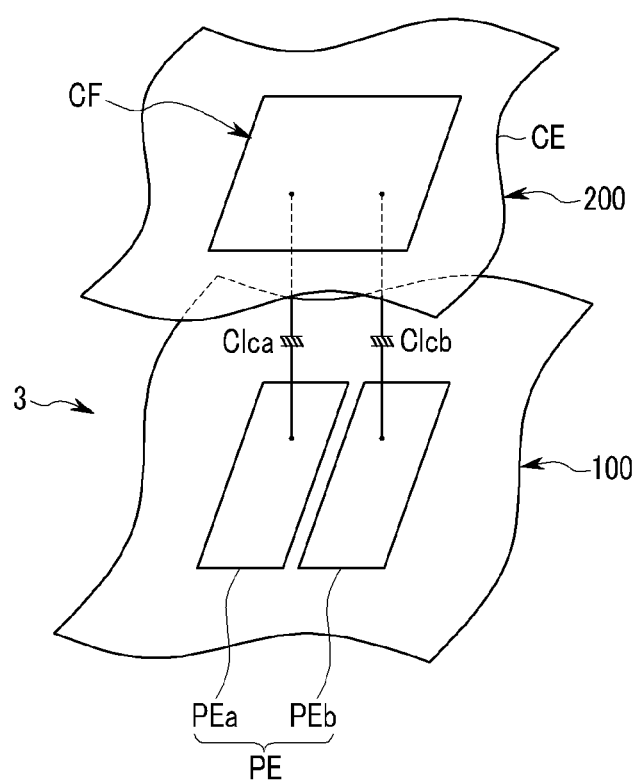
FIG. 2 is a view schematically illustrating a structure of the LCD according to one exemplary embodiment of the present invention and an equivalent circuit of two sub-pixels.
Figure 3:
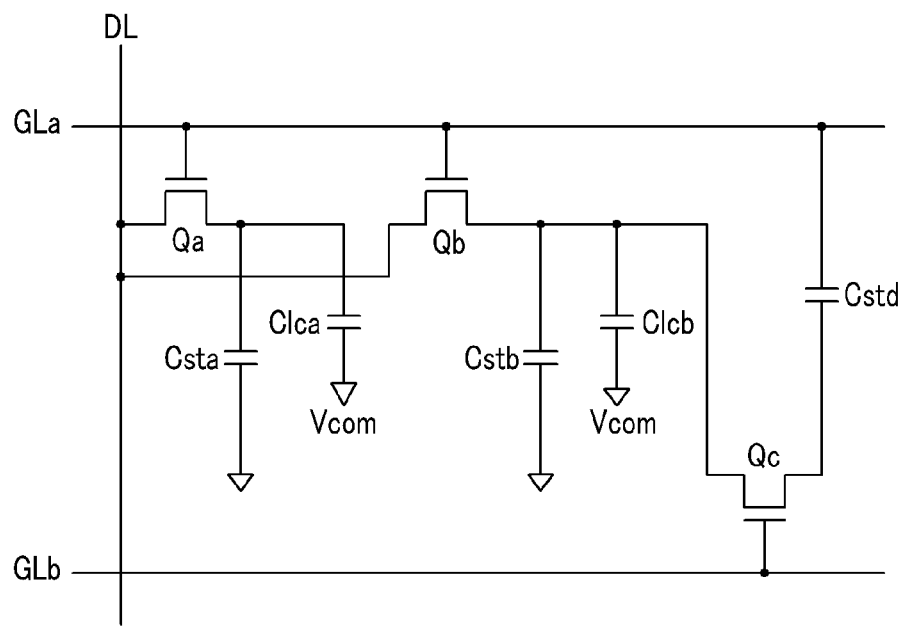
FIG. 3 is an equivalent circuit diagram of a pixel of the LCD according to one exemplary embodiment of the present invention.

FIG. 1 is a block diagram of an LCD according to one exemplary embodiment of the present invention, FIG. 2 is a view schematically illustrating a structure of the LCD according to one exemplary embodiment of the present invention and an equivalent circuit of two sub-pixels, and FIG. 3 is an equivalent circuit diagram of a pixel of the LCD according to one exemplary embodiment of the present invention.

As shown in FIG. 1, an LCD according to one exemplary embodiment of the present invention includes a liquid crystal panel assembly 300, a gate driver 400, a data driver 500, a gray voltage generator 800, and a signal controller 600.

The liquid crystal panel assembly 300, as seen from an equivalent circuit, includes a plurality of signal lines GLa, GLb, and DL (see FIG. 3), and a plurality of pixels PX arranged approximately in the form of a matrix and connected thereto. Meanwhile, in a view of the structure of FIG. 2, the liquid crystal panel assembly 300 includes a lower panel 100 and an upper panel 200 facing each other, and a liquid crystal layer 3 interposed therebetween.

Referring to FIG. 3, the signal line includes a plurality of gate lines GLa and GLb transmitting a gate signal (referred to as "scanning signal"), and a plurality of data lines DL transmitting a data voltage Vd. The gate lines GLa and GLb extend in an approximate row direction and substantially run parallel to one another, and the data lines DL extend in a column direction and substantially run parallel to each other.

The liquid crystal panel assembly according to present exemplary embodiment includes a plurality of pixels PX connected to the signal lines.

Each of the pixels includes a pair of sub-pixels, and each of the sub-pixels includes a liquid crystal capacitor Clca or Clcb. Two sub-pixels include switching elements Qa, Qb, and Qc that are connected to the gate lines GLa and GLb, the data lines DL, and the liquid crystal capacitors Clca and Clcb.

The liquid crystal capacitors Clca and Clcb have two terminals of sub-pixel electrodes PEa and PEb of the lower panel 100 and a common electrode CE of the upper panel 200, and the liquid crystal layer 3 functions as a dielectric material between the sub-pixel electrodes PEa and PEb and the common electrode CE. A pair of sub-pixel electrodes PEa and PEb are separated from each other to form one pixel electrode PE. The common electrode CE is formed at the whole area of the upper panel 200 to receive a common voltage Vcom. The liquid crystal layer 3 has negative dielectric anisotropy, and liquid crystal molecules 31 (shown, for example, in FIG. 5) of the liquid crystal layer 3 may be aligned so that major axes thereof are vertical to the surface of two display panels in the state free of an electric field. Unlike FIG. 2, the common electrode (CE) may be provided on the lower panel 100 according to one or more embodiments. In this case, at least one of two electrodes (PE and CE) may be made in the form of, for example, a line or a bar.

Meanwhile, in order to realize color display, each pixel PX may uniquely display one of the primary colors (spatial division), or each pixel PX may temporally and alternately display the primary colors (temporal division). Then, the primary colors may be spatially or temporally synthesized, and thus a desired color is recognized. An example of the primary colors may be three primary colors of red, green, and blue. One example of the spatial division is represented in FIG. 2 where each pixel PX is provided with a color filter (CF) indicating one of the primary colors on the region of the upper panel 200. Unlike FIG. 2, the color filter (CF) may be formed on or below the sub-pixel electrodes PEa and PEb of the lower panel 100 according to one or more embodiments.

Polarizers (not shown) for providing light polarization may be provided on outer surfaces of the display panels 100 and 200, and the polarization axis of the two polarizers may be crossed. One of the two polarizers may be omitted in a reflective LCD. In the case of the crossed polarizers, the light incident to the liquid crystal layer 3 is blocked when an electric field is not applied.

Referring again to FIG. 1, the gray voltage generator 800 generates all gray voltages or a predetermined number of the gray voltages (or reference gray voltages) related to transmittance of the pixels PX. The (reference) gray voltages may include one set having a positive value for a common voltage Vcom, and another set having a negative value.

The gate driver 400 is connected to the gate lines GLa and GLb of the liquid crystal panel assembly 300, and applies gate signals obtained by combining a gate-on voltage Von and a gate-off voltage Voff to the gate lines GLa and GLb.

The data driver 500 is connected to the data lines DL of the liquid crystal panel assembly 300, and selects the data signals from the gray voltage generator 800 to apply them to the data lines DL as data voltages. However, when the gray voltage generator 800 does not supply a voltage for all grays but supplies only a predetermined number of reference gray voltages, the data driver 500 divides the reference gray voltages to select image data signals.

The signal controller 600 controls the gate driver 400 and the data driver 500.

Each of the drivers 400, 500, 600, and 800 may be directly mounted on the liquid crystal panel assembly 300 in the form of at least one IC chip, may be mounted on a flexible printed circuit film (not shown) and then mounted on the liquid crystal panel assembly 300 in the form of a tape carrier package (TCP), or may be mounted on a separate printed circuit board (not shown). Alternatively, the drivers 400, 500, 600, and 800 may be integrated with the liquid crystal panel assembly 300 together with, for example, the signal lines GLa, GLb, and DL and the thin film transistor switching elements Qa, Qb, and Qc. The drivers 400, 500, 600, and 800 may be integrated into a single chip. In this case, at least one of the drivers or at least one circuit forming the drivers may be arranged outside the single chip.

A liquid crystal panel assembly according to an exemplary embodiment of the present invention will now be described in detail with reference to FIG. 3 to FIG. 5.

Referring to FIG. 3, the liquid crystal display according to the present exemplary embodiment includes signal lines of neighboring first and second gate lines GLa and GLb, a data line DL, and a plurality of pixels PX that are connected to the signal lines.

The pixel PX includes the first, second, and third switching elements Qa, Qb, and Qc, the first and second liquid crystal capacitors Clca and Clcb, the first and second storage capacitors Csta and Cstb, and a step-down capacitor Cstd. The first and second switching elements Qa and Qb are respectively connected to the first gate line GLa and the data line DL, and the third switching element Qc is connected to the second gate line GLb.

The first and second switching elements Qa and Qb are three terminal elements such as thin film transistors provided in the lower panel 100, and the first switching elements Qa have control terminals connected to one of the first gates line GLa, input terminals connected to the data line DL, and output terminals connected to the first liquid crystal capacitor Clca and the first storage capacitor Csta.

The second switching element Qb has the control terminal connected to the first gate line GLa, the input terminal connected to the data line DL, and the output terminal connected to the second liquid crystal capacitor Clcb and the second storage capacitor Cstb.

The third switching element Qc is also a three terminal element such as a thin film transistor provided in the lower panel 100, the control terminal of which is connected to one of the second gate lines GLb, the input terminal of which is connected to the second liquid crystal capacitor Clcb, and the output terminal of which is connected to the step-down capacitor Cstd.

The step-down capacitor Cstd is connected to the output terminal of the third switching element Qc and the first gate line GLa, and is formed by overlapping the capacitor electrode (not shown) extended from the first gate line Gla and the output electrode of the third switching element Qc via the insulator therebetween.

Now, the liquid crystal panel assembly shown in FIG. 3 will be described in detail with reference to FIG. 4 and FIG. 5 according to one or more embodiments.

Figure 4:
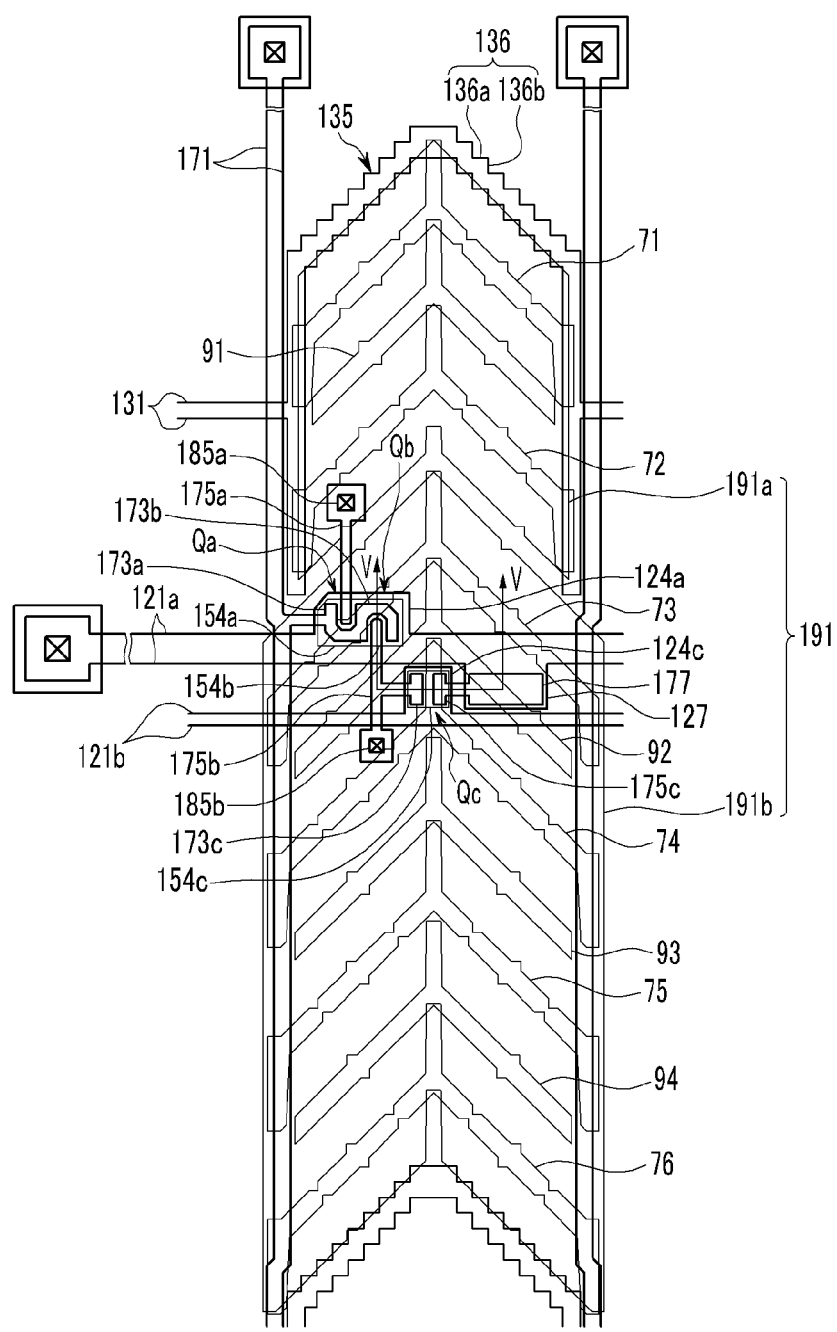
FIG. 4 is a layout view of a liquid crystal display according to one exemplary embodiment of the present invention.
Figure 5:
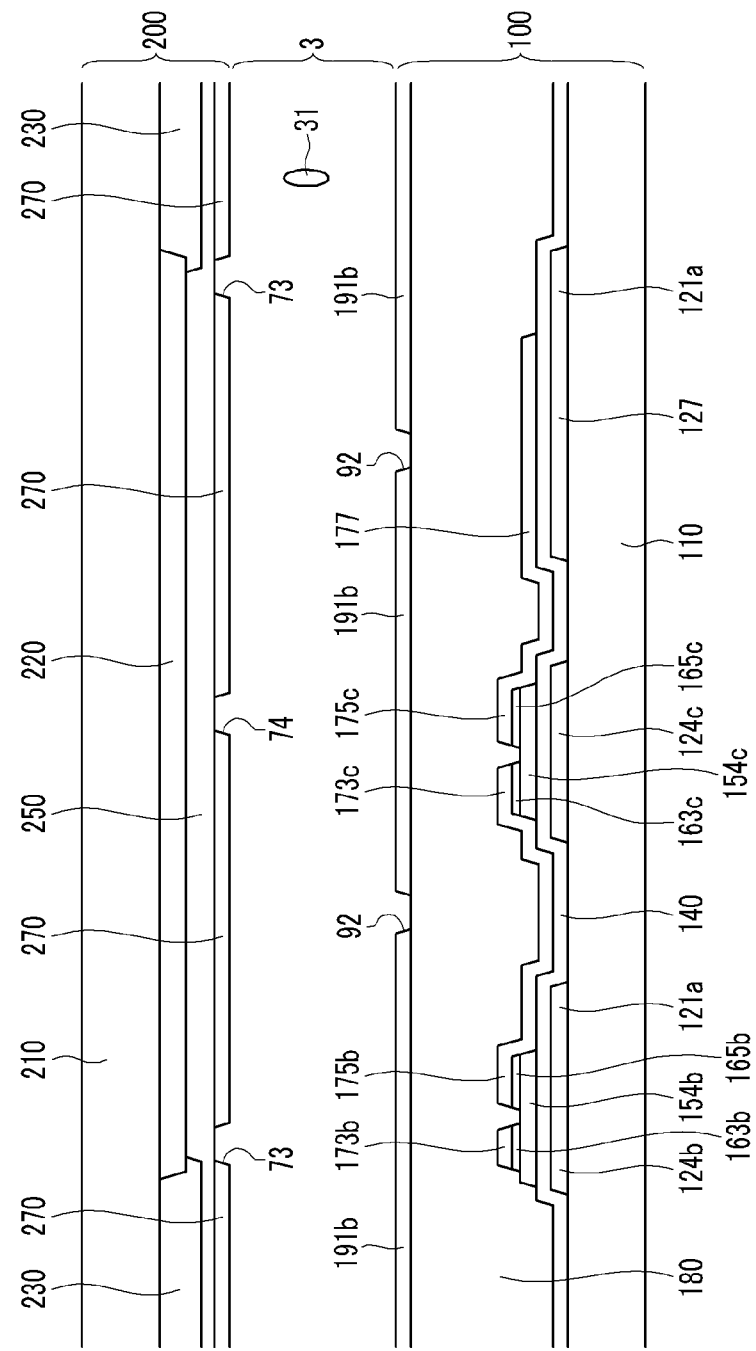
FIG. 5 is a cross-sectional view taken along line V-V in the liquid crystal display of FIG. 4.

FIG. 4 is a layout view of a liquid crystal panel assembly according to an exemplary embodiment of the present invention, and FIG. 5 is a cross-sectional view of the liquid crystal display shown in FIG. 4 taken along the line V-V.

The liquid crystal display according to the present exemplary embodiment includes the lower panel 100 and the upper panel 200, and the liquid crystal layer 3 disposed between the two display panels 100 and 200.

Firstly, the lower panel 100 will be described according to an embodiment.

A plurality of gate conductors including a plurality of first and second gate lines 121a and 121b, and a plurality of storage electrode lines 131 are formed on an insulation substrate 110. The first gate line 121a includes a first gate electrode 124a, a second gate electrode 124b, and a capacitor electrode 127, and the second gate line 121b includes a third gate electrode 124c.

The storage electrode lines 131 include a stem perpendicular to the gate lines 121a and 121b. Also, the storage electrode line 131 includes a light blocking member 135 extended from the stem and forming an oblique angle along with the gate lines 121a and 121b.

A gate insulating layer 140 is formed on the gate conductors 121a, 121b, and 131. The first, second, and third semiconductor islands 154a, 154b, and 154c are formed on the gate insulating layer 140, and a plurality of first ohmic contacts (not shown), second ohmic contacts 163b and 165b, and third ohmic contacts 163c and 165c are formed thereon.

A plurality of data conductors including a plurality of data lines 171, a plurality of first, second, and third drain electrodes 175a, 175b, and 175c, and electrode members 177 are formed on the ohmic contacts 163b, 163c, 165b, and 165c, and the gate insulating layer 140.

Each data line 171 has a plurality of first and second source electrodes 173a and 173b, and a wide end portion (not shown) to be connected with other layers or external driving circuits.

The first to third drain electrodes 175a, 175b, and 175c have wide end portions at one side thereof, and bar-shaped end portions at the other side thereof. The bar-shaped end portions of the first and second drain electrodes 175a and 175b are partially surrounded by the first and second source electrodes 173a and 173b. The second drain electrode 175b is extended thereby forming a bar-shaped third source electrode 173c. The third drain electrode 175c faces one end of the third source electrode 173c, and the other end of the third source electrode 173c is extended thereby forming the electrode member 177.

The first gate electrode 124a, the first source electrode 173a, and the first drain electrode 175a form the first thin film transistor (TFT) Qa along with the first semiconductor island 154a, and the channel of the thin film transistor is formed in the semiconductor 154a between the source electrode 173a and the drain electrode 175a. The second gate electrode 124b, the second source electrode 173b, and the second drain electrode 175b form the second thin film transistor Qb along with the second semiconductor island 154b, and the third gate electrode 124c, the third source electrode 173c, and the third drain electrode 175c form the third thin film transistor Qc along with the third semiconductor island 154c.

A passivation layer 180 is formed on the data conductors 171, 173c, 175a, 175b, 175c, and 177 and the exposed semiconductors 154a, 154b, and 154c.

The passivation layer 180 has a plurality of contact holes 185a and 185b exposing the wide end portion of the first drain electrode 175a and the second drain electrode 175b, and a plurality of contact holes (not shown) exposing end portions of the data lines 171, and the passivation layer 180 and the gate insulating layer 140 have a plurality of contact holes (not shown) exposing end portions of the gate lines 121.

A plurality of pixel electrodes 191 including first and second sub-pixel electrodes 191a and 191b, and a plurality of contact assistants (not shown) are formed on the passivation layer 180.

The first sub-pixel electrode 191a has a pair of longitudinal edges (not shown) facing each other, and two pairs of first to fourth oblique edges (not shown) neighboring the pair of longitudinal edges. The second sub-pixel electrode 191b also has a pair of longitudinal edges (not shown) facing each other, and two pairs of first to fourth oblique edges (not shown) neighboring the pair of longitudinal edges. The respective longitudinal edges stand parallel to the data line 171, and the respective oblique edges are obliquely angled to the longitudinal edges. The oblique edges form a neighboring pair and meet each other at right angles.

The first and second sub-pixel electrodes 191a and 191b are adjacent to each other in the column direction, and the first sub-pixel electrode 191a is smaller in height than the second sub-pixel electrode 191b.

The first sub-pixel electrode 191a has a cutout 91, and the second sub-pixel electrode 191b has cutouts 92, 93, and 94.

The cutouts 91, 92, 93, and 94 of the first and second sub-pixel electrodes 191a and 191b are angled to the gate lines 121a and 121b at about 45°. The pixel electrode 191 is partitioned into several domains by way of the cutouts. The number of domains or cutouts may be altered depending upon design factors such as the pixel size, the length ratio of the horizontal edge of the pixel electrode to the vertical edge thereof, and the kind or characteristics of the liquid crystal layer 3.

The first and second sub-pixel electrodes 191a and 191b are respectively physico-electrically connected to the first and second drain electrodes 175a and 175b through the contact holes 185a and 185b to respectively receive data voltages therefrom.

The first and second sub-pixel electrodes 191a and 191b generate electric fields in association with the common electrode 270 of the common electrode display panel 200, thereby determining the alignment directions of the liquid crystal molecules 31 of the liquid crystal layer 3 between the two electrodes 191 and 270. The polarization of light passing through the liquid crystal layer 3 is differentiated depending upon the determined alignment directions of the liquid crystal molecules 31. The pixel electrode 191 and the common electrode 270 form a liquid crystal capacitor to store voltages applied thereto even after the thin film transistor turns off.

The pixel electrodes 191 overlap the storage electrode lines 131. The pixel electrode 191 is overlapped with the storage electrode lines 131 so as to form a storage capacitor, which reinforces the voltage storage capacity of the liquid crystal capacitor.

The capacitor electrode 127 and the electrode member 177 of the third drain electrode 175c are overlapped with each other by interposing the gate insulating layer 140 so as to form a step-down capacitor Cstd.

As described above, with a liquid crystal display according to an exemplary embodiment of the present invention, the step-down capacitor Cstd is formed using the capacitor electrode 127 extended from the first gate line 121a without providing a separate capacitor electrode line and a separate capacitor electrode so that the aperture ratio can be enhanced compared to the case where a separate capacitor electrode line and a separate capacitor electrode are provided to form the step-down capacitor Cstd.

The contact assistants (not shown) are connected to the end portions of the gate lines 121 and the end portions of the data lines 171 through contact holes (not shown), respectively. The contact assistants serve to assist the adhesion of the end portions of the gate lines 121 and the end portions of the data lines 171 to external devices while protecting them.

The upper display panel 200 will now be described in detail according to an embodiment.

A light blocking member 220 is formed on an insulation substrate 210. The light blocking member 220, also called a black matrix, prevents the leakage of light.

A plurality of color filters 230 are formed on the insulation substrate 210. The color filters 230 mostly exist within the area surrounded by the light blocking member 220, and may longitudinally extend along the columns of the pixel electrodes 191 in the longitudinal direction. The respective color filters 230 may express one of three primary colors of red, green, and blue.

An overcoat 250 is formed on the color filters 230 and the light blocking member 220.

The common electrode 270 is formed on the overcoat 250. A plurality of sets of cutouts 71, 72, 73, 74, 75, and 76 are formed at the common electrode 270. The respective cutouts 71 to 76 have at least one oblique portion proceeding parallel to the cutouts 91 to 94 of the pixel electrode 191. Triangle-shaped notches are formed at the oblique portions of the cutouts 71 to 76.

Alignment layers (not shown) are formed on the inner surfaces of the display panels 100 and 200, respectively. The alignment layers may be vertical alignment layers.

The liquid crystal layer 3 has negative dielectric anisotropy, and liquid crystal molecules 31 of the liquid crystal layer 3 are aligned such that the directors thereof stand vertical to the surface of the two display panels 100 and 200.

When the liquid crystal capacitors Clca and Clcb are charged, an electric field is generated substantially vertical to the surface of the display panels 100 and 200. In response to the electric field, the liquid crystal molecules 31 are inclined to be oriented such that the directors thereof stand vertical to the direction of the electric field.

Meanwhile, the cutouts 91 to 94 and 71 to 76 of the pixel electrode 191 and the common electrode 270, being the field generating electrodes, and the oblique edges of the pixel electrode 191 proceeding parallel thereto, deform the electric fields, and form horizontal components for determining the inclination direction of the liquid crystal molecules 31. The horizontal components of the electric field stand vertical to the oblique edges of the cutouts 91 to 94 and 71 to 76, and the oblique edges of the pixel electrode 191.

The set of common electrode cutouts 71 to 76 and the set of pixel electrode cutouts 91 to 94 partition the pixel electrode 191 into a plurality of domains, each of which has two major edges obliquely angled to the major edges of the pixel electrode 191. The liquid crystal molecules over the respective pixel electrode domains are mostly inclined in a direction vertical to the major edges thereof, and hence, roughly four inclination directions are formed. As the inclination directions of the liquid crystal molecules are diversified, the reference viewing angle of the liquid crystal display becomes widened.

Meanwhile, the light blocking member 135 is formed along two oblique edges of the first sub-pixel electrode 191a, and two oblique edges of the second sub-pixel electrode 191b. The light blocking member 135 has a plurality of steps 136 with transverse and longitudinal portions 136a and 136b. The transverse portion 136a stands parallel to the gate lines 121a and 121b, and the longitudinal portion 136b stands parallel to the data line 171. The polarization axis of the polarizers is angled to the oblique edges at about 45° or 135°, and therefore leakage of light does not occur around the oblique edges. If the light blocking member 135 having steps 136 each with transverse and longitudinal portions 136a and 136b standing parallel to the polarization axis of the polarizers is disposed at two oblique edges of the first sub-pixel electrode 191a and two oblique edges of the second sub-pixel electrode 191b, the possible leakage of light at the area of the pixel electrode 191 may be prevented.

The transverse and longitudinal portions 136a and 136b of the step 136 may be identical in length with each other. The transverse and longitudinal portions 136a and 136b may have a length of 8 μm to 12 μm respectively, which prevents the leakage of light.

The operation of a liquid crystal display according to an exemplary embodiment of the present invention will now be described with reference to FIG. 4 and FIG. 5 as well as FIG. 1 to FIG. 3 according to one or more embodiments.

Referring to FIG. 1, the signal controller 600 receives input image signals R, G, and B and input control signals for controlling those input image signals from an external graphics controller (not shown). The input image signals R, G, and B contain information regarding luminance of the respective pixels PX, which has a predetermined number of grays, for example $1024=2^{10}$, $256=2^8$, or $64=2^6$ grays. The input control signals include vertical synchronization signals Vsync, horizontal synchronization signals Hsync, main clock signals MCLK, and data enable signals DE.

The signal controller 600, based on the received input image signals R, G, and B and input control signals, properly processes the input image signals R, G, and B in accordance with the operating conditions of the liquid crystal panel assembly 300, and generates gate control signals CONT1 and data control signals CONT2. Then, the signal controller 600 transmits the gate control signals CONT1 to the gate driver 400, while transmitting the data control signals CONT2 and the processed image signals DAT to the data driver 500. The output image signals DAT have a predetermined number of values or grays as digital signals.

Depending upon the data control signals CONT2 from the signal controller 600, the data driver 500 receives the digital image signals DAT for one row of pixels PX, and selects gray voltages corresponding to the respective digital image signals DAT, followed by converting the digital image signals DAT into analog data voltages and applying them to the relevant data lines DL.

Upon receipt of the gate control signals CONT1 from the signal controller 600, the gate driver 400 applies gate-on voltages Von to the gate lines GLa and GLb so as to turn on the switching elements Qa, Qb, and Qc connected to the gate lines GLa and GLb. Then, the data voltages Vd applied to the data lines DL are applied to the relevant pixels PX through the turned-on first and second switching elements Qa and Qb.

Description will be now given with respect to a particular row of pixels, for example the i-th pixel row according to one or more embodiments.

A first gate signal is applied to the first gate line GLa of the i-th pixel row, and a second gate signal is applied to the second gate line GLb thereof. When the first gate signal shifts from the gate-off voltage Voff to the gate-on voltage Von, the first and second switching elements Qa and Qb connected thereto are turned on. Accordingly, the data voltage Vd applied to the data line DL is applied to the first and second sub-pixel electrodes PEa, PEb through the turned-on first and second switching elements Qa and Qb. In this case, the data voltages Vd applied to the first and second sub-pixel electrodes PEa, PEb are identical to each other. The first and second liquid crystal capacitors Clca and Clcb are charged with the same value as a difference between the common voltage and the data voltage Vd.

Thereafter, when the first gate signal shifts from the gate-on voltage Von to the gate-off voltage Voff, and simultaneously the second gate signal shifts from the gate-off voltage Voff to the gate-on voltage Von, the first and second switching elements Qa and Qb turn off, while the third switching element Qc turns on. Thus, the charges are moved from the second sub-pixel electrode PEb Qc to the third drain electrode 175c through the third switching element. Consequently, the voltage charged at the second liquid crystal capacitor Clcb is lowered, while the step-down capacitor Cstd is charged. The voltage charged at the second liquid crystal capacitor Clcb is lowered by the capacitance of the step-down capacitor Cstd such that the voltage charged at the second liquid crystal capacitor Clcb is lower than that of the first liquid crystal capacitor Ccla.

The voltages charged at the two liquid crystal capacitors Clca and Clcb express different gamma curves, which are combined to be a complex gamma curve of a pixel voltage. The frontal complex gamma curve coincides with the reference gamma curve at the optimally-determined front side, and the lateral gamma curve approximates the frontal reference gamma curve. In this way, the image data are converted so that the lateral visibility is improved.

The above process is repeated by a unit one horizontal period, which is also called "1H" and is the same as one cycle of the horizontal synchronization signal Hsync and the data enable signal DE, thereby applying data voltages Vd to all the pixels PX and displaying images of one frame.

After one frame terminates, the next frame begins, and the reverse signal RVS applied to the data driver 500 is controlled such that the data voltage Vd applied to each pixel PX is opposite in polarity to that in the previous frame.

The voltages charged at the first and second liquid crystal capacitors Csta and Cstb may be controlled according to the capacitance of the step-down capacitor Cstd.

Figure 6:
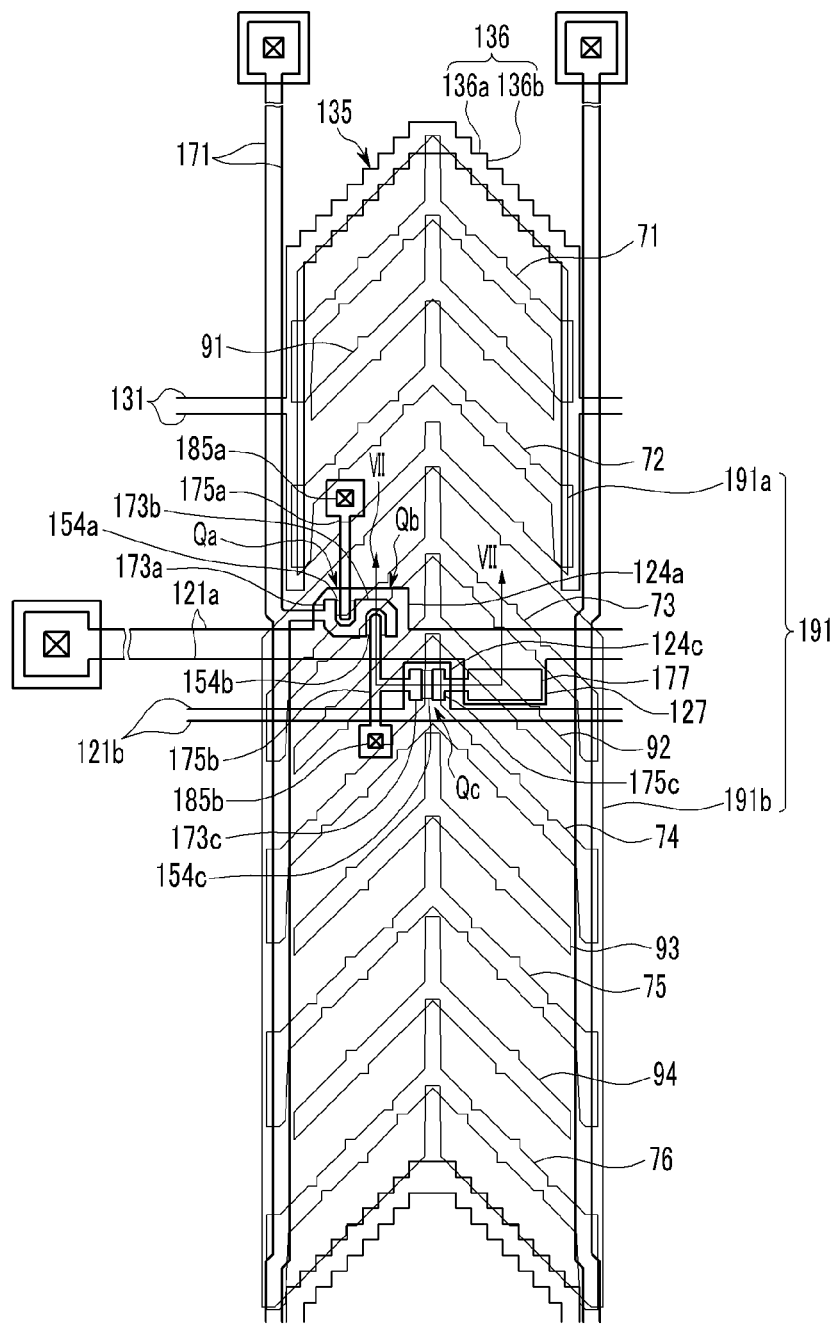
FIG. 6 is a layout view of a liquid crystal display according to another exemplary embodiment of the present invention.

A liquid crystal display according to another exemplary embodiment of the present invention will now be described in detail with reference to FIG. 6 and FIG. 7. FIG. 6 is a layout view of a liquid crystal display according to another exemplary embodiment of the present invention, and FIG. 7 is a cross-sectional view of the liquid crystal display shown in FIG. 6 taken along the line VII-VII.

Figure 7:
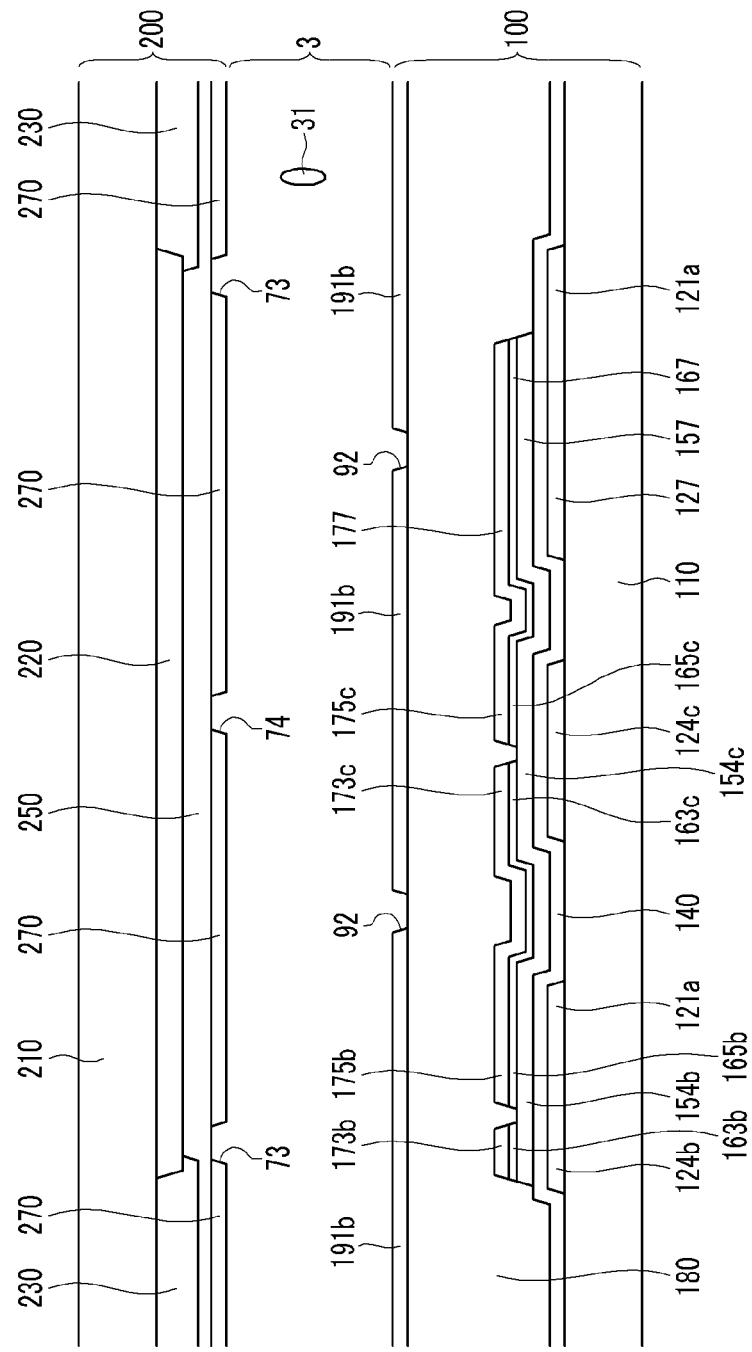
FIG. 7 is a cross-sectional view taken along line VII-VII in the liquid crystal display of FIG. 6.

Referring to FIG. 6 and FIG. 7, a layered structure of a liquid crystal display according to the present exemplary embodiment is similar to the liquid crystal display shown in the embodiments of FIG. 4 and FIG. 5.

The liquid crystal display according to the present exemplary embodiment includes a lower panel 100 and an upper panel 200, and a liquid crystal layer 3 interposed between the two display panels 100 and 200.

Referring to the lower panel 100, a plurality of gate conductors including a plurality of pairs of first and second gate lines 121a and 121b, a plurality of storage electrode lines 131, and a plurality of capacitor electrodes 127 are formed on an insulation substrate 110, and a gate insulating layer 140 is formed on the gate conductors 121a, 121b, and 131. Semiconductors 154a, 154b, 154c, and 157 are formed on the gate insulating layer 140, and a plurality of first ohmic contacts (not shown), second ohmic contacts 163b and 165b, and third ohmic contacts 163c and 165c, and fourth ohmic contacts 167 are formed thereon.

A plurality of data conductors including a plurality of data lines 171, a plurality of first, second, and third drain electrodes 175a, 175b, and 175c and electrode members 177 are formed on the ohmic contacts 163b, 163c, 165b, and 165c, a passivation layer 180 is formed on the gate insulating layer 140, the data conductors 171, 173c, 175a, 175b, 175c, and 177, and the exposed semiconductors 154a, 154b, and 154c, and a plurality of pixel electrodes 191 including the first and second sub-pixel electrodes 191a and 191b, and a plurality of contact assistants (not shown) are formed on the passivation layer 180. The pixel electrodes 191 have a plurality of cutouts 91, 92, 93, and 94.

Referring to the upper panel 200, a light blocking member 220 is formed on an insulation substrate 210, color filters 230 are formed on the substrate 210 and a portion of the light blocking member, an overcoat 250 is formed on the color filter 230 and the light blocking member 220, and a common electrode 270 is formed on the overcoat 250. The common electrode 270 includes a plurality of cutouts 71, 72, 73, 74, 75, and 76.

However, differently from the liquid crystal display of the embodiments of FIG. 4 and FIG. 5, the semiconductor stripes 154a, 154b, 154c, and 157 except for the channels have substantially the same planar shape as the data lines 171, the first to third drain electrodes 175a, 175b, and 175c, the electrode members 177, and the underlying ohmic contacts 163b, 163c, 165b, 165c, and 167. Also, the semiconductor stripes have exposed portions that are not covered by the data lines 171 and the drain electrodes 175a-c as well as the portion between the source electrodes 173a-c and the drain electrodes 175a-c.

In the manufacturing method of the lower panel 100 according to an exemplary embodiment of the present invention, the data conductors 171, 175a, 175b, 175c, and 177, the semiconductors 154a-c and 157, and the ohmic contacts 163b, 163c, 165b, 165c, and 167 are formed through one photolithography process.

A photosensitive film used in this photolithography process has different thicknesses depending on positions, and particularly includes a first portion and a second portion at which the thicknesses are reduced. The first portion is located at a wiring region provided with the data conductors 171, 175a, 175b, 175c, and 177, and the second portion is located at the channel regions of the thin film transistors.

There are many methods of forming the difference in thicknesses according to the location of the photosensitive film. One example of the methods includes forming a photomask with a translucent area as well as a light transmitting area and a light blocking area. The translucent area is provided with a slit pattern, a lattice pattern, or a thin film having medium transmittance or thickness. In the case of utilizing the slit pattern, the slit width or the space between the slits may be smaller than the resolution of exposure equipment used in the photolithography process. Another example of the method includes using a reflowable photosensitive film. That is, the method forms a thin portion by making a photosensitive film flow into a region where the photosensitive film is not present after forming the reflowable photosensitive film with a general exposure mask having only a light transmitting area and a light blocking area.

Since this reduces time for the photolithography process, the manufacturing method is simplified.

Like the liquid crystal display shown in the embodiments of FIG. 4 and FIG. 5, the liquid crystal display according to the present exemplary embodiment also includes a step-down capacitor Cstd formed by overlapping the capacitor electrode 127 and the electrode member 177 of the third drain electrode 175c via the gate insulating layer 140, the semiconductor 157, and the ohmic contact 167. Accordingly, the step-down capacitor Cstd is formed by using the capacitor electrode 127 extended from the first gate line 121a without the separate capacitor electrode line and the capacitor electrode such that the aperture ratio and the visibility may be improved compared with the case that the separate capacitor electrode line and the capacitor electrode are used to form the step-down capacitor Cstd.

The capacitor electrode 127 of the step-down capacitor Cstd of the liquid crystal display according to the present exemplary embodiment is extended from the first gate line 121a. Accordingly, if the first gate line 121a is applied with the gate-on signal, the capacitor electrode 127 is also applied with the same voltage magnitude as that of the gate-on signal such that the voltage of the same polarity is applied without the polarity of the voltage applied to the pixel electrode 191. Accordingly, although the capacitor electrode 127 and the electrode member 177 form the step-down capacitor Cstd via the semiconductor 157 and the ohmic contact 167 as well as the gate insulating layer 140 like the present exemplary embodiment, it may be prevented that the capacitance of the step-down capacitor Cstd is changed due to the activation or the inactivation of the semiconductor 157 and the ohmic contact 167 according to the change of the polarity of the capacitor electrode 127. Accordingly, the capacitance of the step-down capacitor Cstd may be uniformly maintained with the desired value while simplifying the manufacturing process.

Figure 8:
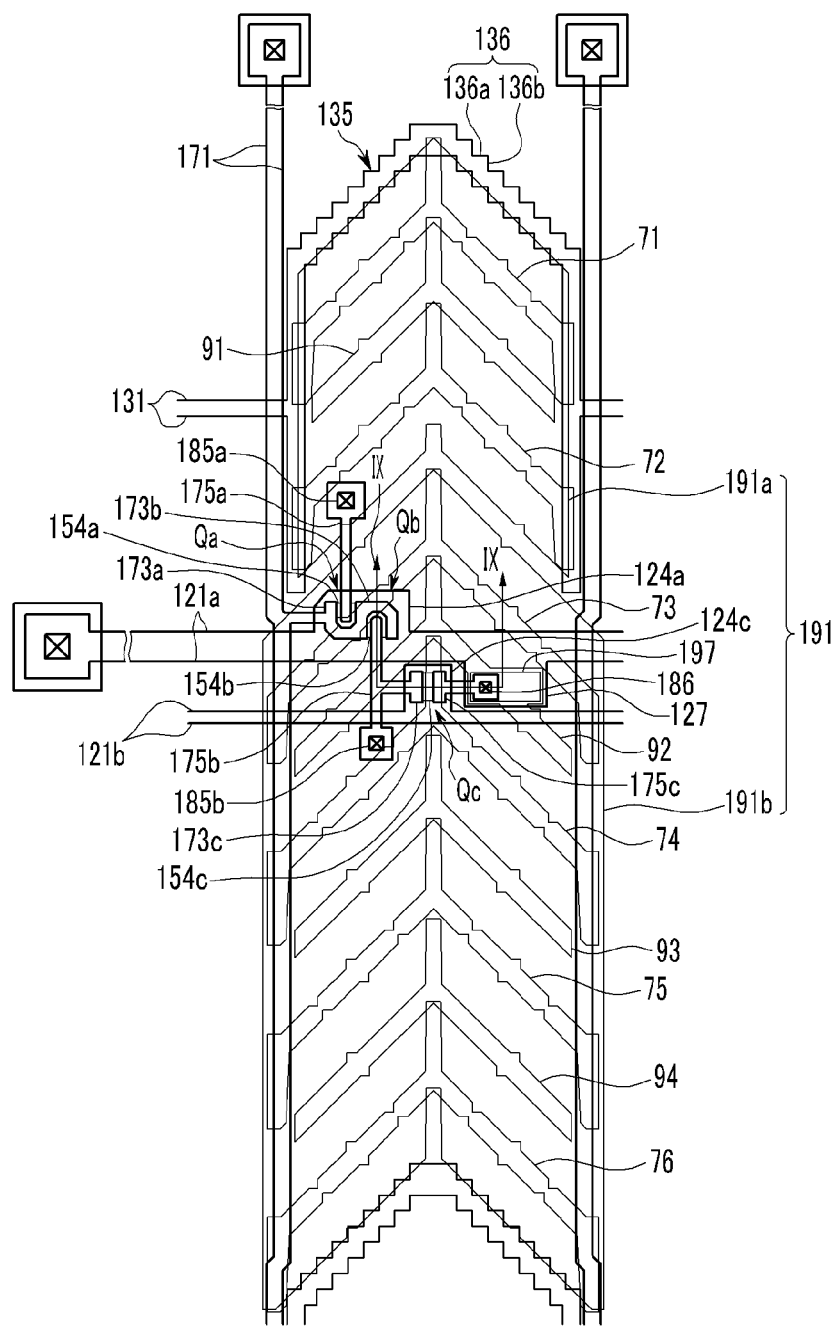
FIG. 8 is a layout view of a liquid crystal display according to another exemplary embodiment of the present invention.

A liquid crystal display according to another exemplary embodiment of the present invention will now be described in detail with reference to FIG. 8 and FIG. 9. FIG. 8 is a layout view of a liquid crystal display according to another exemplary embodiment of the present invention, and FIG. 9 is a cross-sectional view of the liquid crystal display shown in FIG. 8 taken along the line IX-IX.

Figure 9:
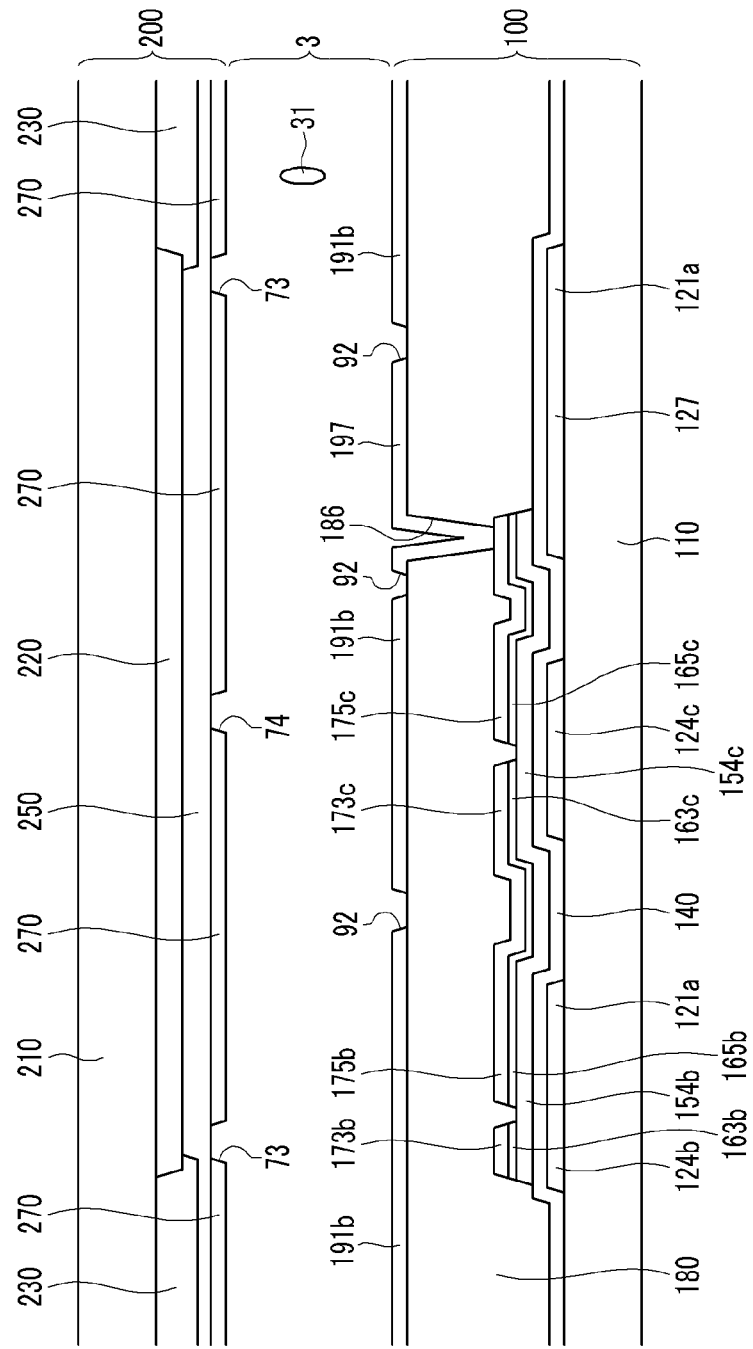
FIG. 9 is a cross-sectional view taken along line IX-IX in the liquid crystal display of FIG. 8.

Referring to FIG. 8 and FIG. 9, a layered structure of a liquid crystal display according to the present exemplary embodiment is similar to the liquid crystal display shown in the embodiments of FIG. 6 and FIG. 7.

However, differently from the exemplary embodiment shown in FIG. 6 and FIG. 7, the electrode member 197 of the liquid crystal display according to the present exemplary embodiment is not made of the expansion of the third drain electrode 175c, but is formed with the same layer as the pixel electrode 191 and is insulated from the pixel electrode 191.

The second sub-pixel electrode 191b of the pixel electrode 191 is removed on the region where the electrode member 197 is disposed, and the cutout 92 of the second sub-pixel electrode 191b of the pixel electrode 191 is extended on the region where the electrode member 197 is disposed, thereby enclosing the electrode member 197. Accordingly, the second sub-pixel electrode 191b and the electrode member 197 are separated from each other.

As above-described, the step-down capacitor Cstd of the liquid crystal display according to the present exemplary embodiment is formed by overlapping the capacitor electrode 127 extended from the first gate line 121a and the electrode member 197 with the same layer as the pixel electrode 191 via the gate insulating layer 140 and the passivation layer 180. In this way, the data conductors 171, 175a, 175b, and 175c, and the underlying semiconductors 154a-c and ohmic contacts 163b, 163c, 165b, and 165c are formed through one photolithography process and the semiconductor layer does not exist between the capacitor electrode 127 and the electrode member 197 forming the step-down capacitor Cstd such that the change of the capacitance of the step-down capacitor Cstd due to the activation inactivation of the semiconductor layer may be prevented. Also, the photolithography process to form the liquid crystal display may be reduced such that the manufacturing method is simplified.

Also, like the above-described embodiment, the step-down capacitor Cstd is formed by using the capacitor electrode 127 extended from the first gate line 121a without the separate capacitor electrode line and the capacitor electrode such that the aperture ratio may be improved and the visibility is improved compared with the case that the separate capacitor electrode line and the capacitor electrode are formed to form the step-down capacitor Cstd.

Figure 10:
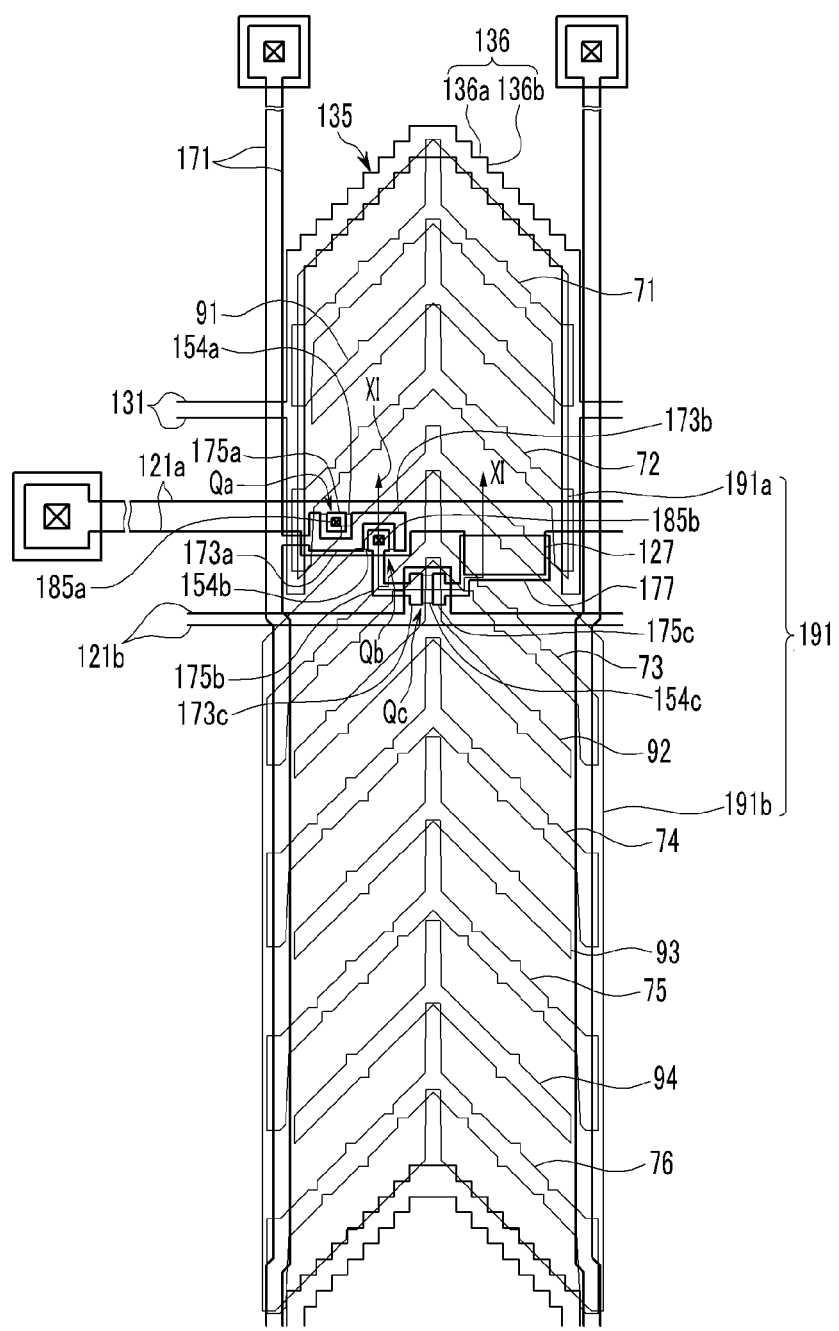
FIG. 10 is a layout view of a liquid crystal display according to another exemplary embodiment of the present invention.

A liquid crystal display according to another exemplary embodiment of the present invention will now be described in detail with reference to FIG. 10 and FIG. 11. FIG. 10 is a layout view of a liquid crystal display according to another exemplary embodiment of the present invention, and FIG. 11 is a cross-sectional view of the liquid crystal display shown in FIG. 10 taken along the line XI-XI.

Figure 11:
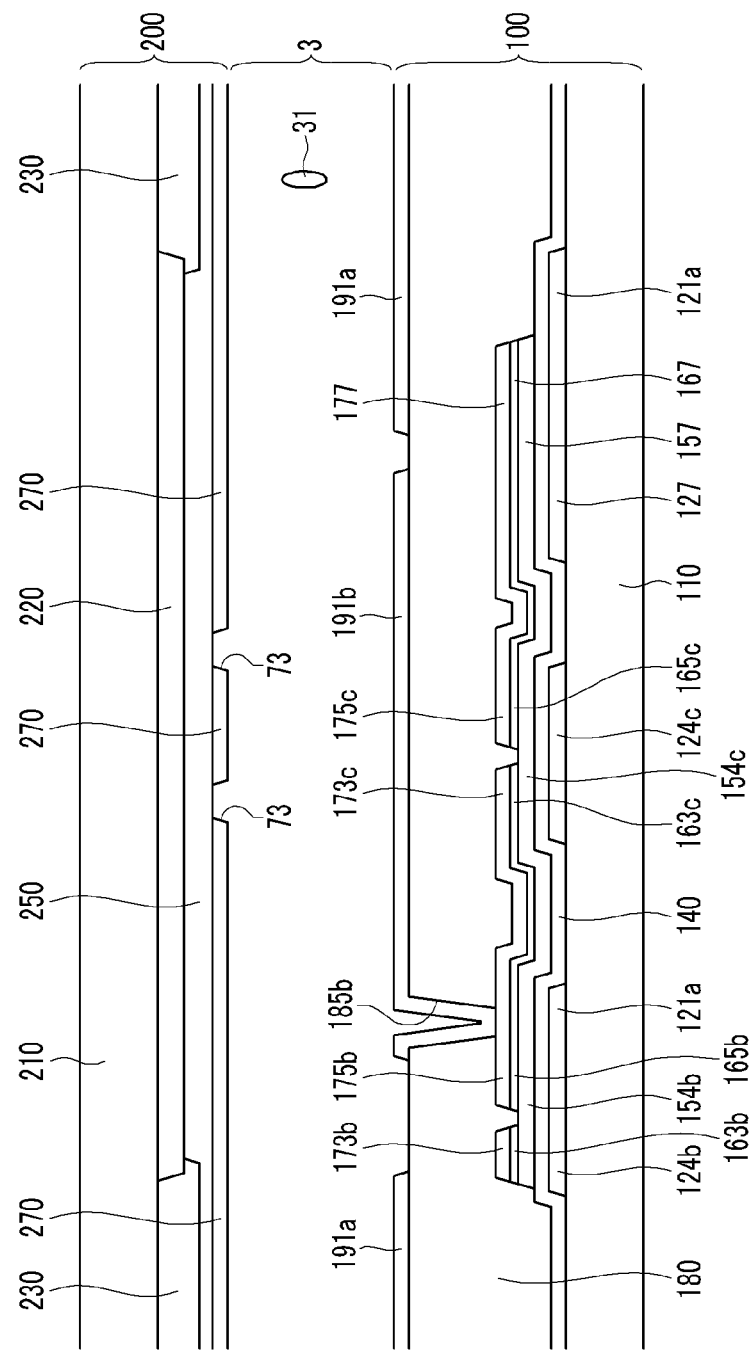
FIG. 11 is a cross-sectional view taken along line XI-XI in the liquid crystal display of FIG. 10.

Referring to FIG. 10 and FIG. 11, a layered structure of a liquid crystal display according to the present exemplary embodiment is similar to the liquid crystal display shown in the embodiments of FIG. 6 and FIG. 7. However, differently from the exemplary embodiment shown in FIG. 6 and FIG. 7, the first drain electrode 175a and the second drain electrode 175b are disposed in the region enclosed by the first source electrode 173a and the second source electrode 173b, and are respectively disposed in the region of the first sub-pixel electrode 191a and the second sub-pixel electrode 191b. Also, the first contact hole 185a and the second contact hole 185b to respectively connect the first drain electrode 175a and the second drain electrode 175b to the first sub-pixel electrode 191a and the second sub-pixel electrode 191b are disposed directly on the first drain electrode 175a and the second drain electrode 175b. Accordingly, the channel length of the first switching element Qa and the second switching element Qb may be extended, and the region occupied with the first drain electrode 175a and the second drain electrode 175b is reduced such that the aperture ratio of the liquid crystal display may be increased.

Like the liquid crystal display shown in the embodiments of FIG. 4 and FIG. 5, the liquid crystal display according to the present exemplary embodiment also includes a step-down capacitor Cstd formed by overlapping the capacitor electrode 127 and the electrode member 177 of the third drain electrode 175c via the gate insulating layer 140, the semiconductor 157, and the ohmic contact 167. Accordingly, the step-down capacitor Cstd is formed by using the capacitor electrode 127 extended from the first gate line 121a without the separate capacitor electrode line and the capacitor electrode such that the aperture ratio may be improved and the visibility may be improved compared with the case that the separate capacitor electrode line and the capacitor electrode are formed to form the step-down capacitor Cstd. Also, the photolithography process to form the liquid crystal display may be reduced such that the manufacturing method is simplified.

Figure 12:
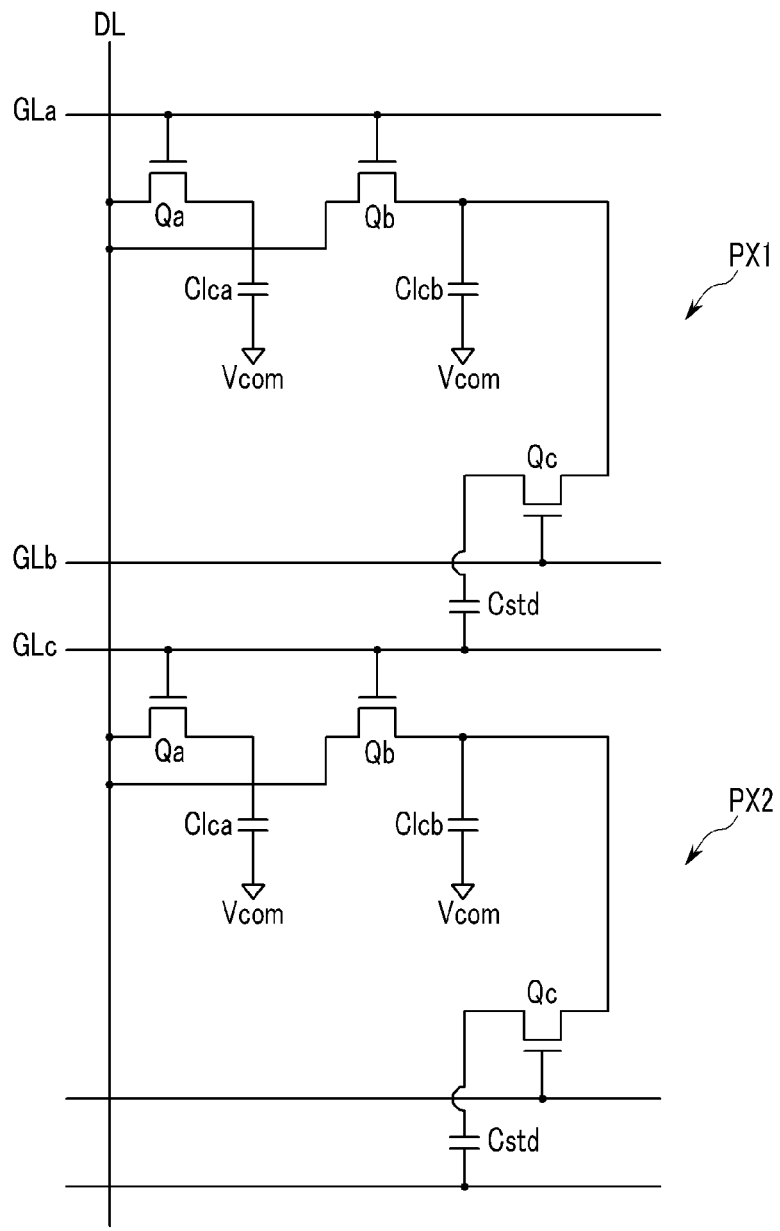
FIG. 12 is an equivalent circuit diagram of a pixel of the LCD according to another exemplary embodiment of the present invention.
Figure 13:
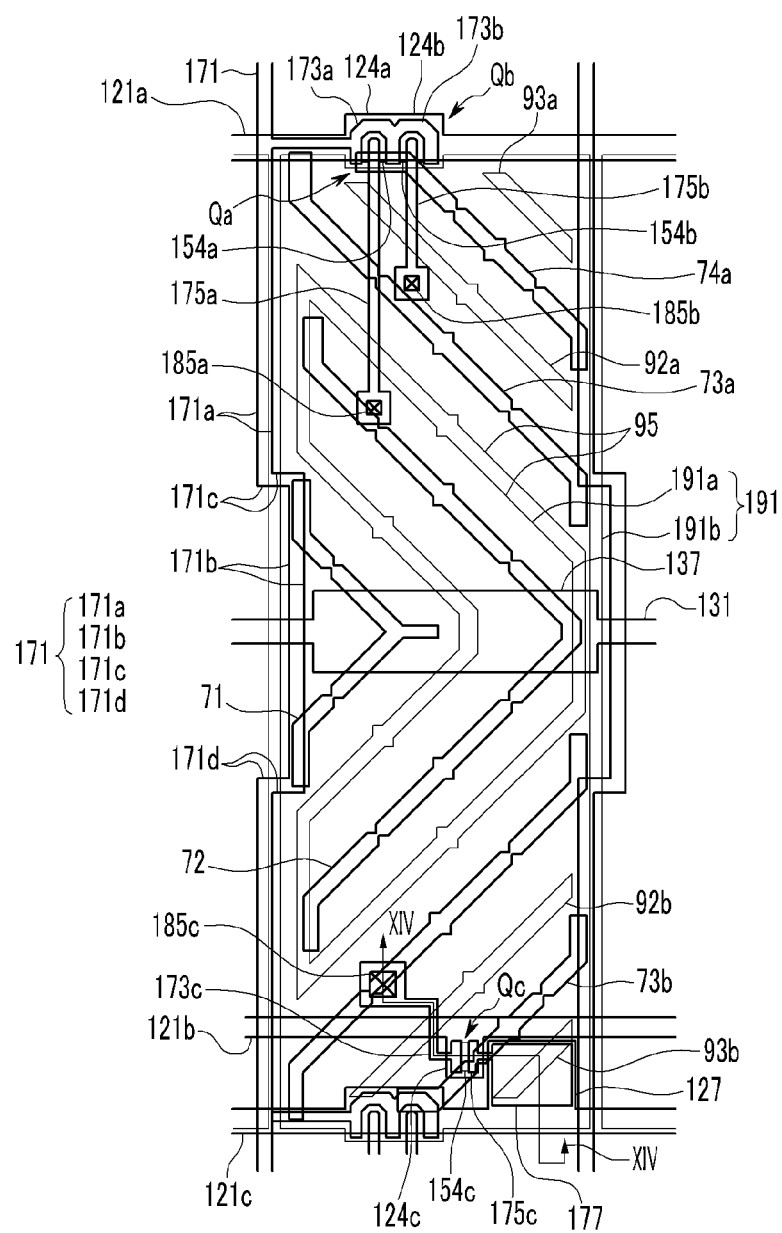
FIG. 13 is a layout view of a liquid crystal display according to another exemplary embodiment of the present invention.

Next, another exemplary embodiment of the present invention will be described with reference to FIG. 12 to FIG. 14. FIG. 12 is an equivalent circuit diagram of a pixel of the LCD according to another exemplary embodiment of the present invention, FIG. 13 is a layout view of a liquid crystal display according to another exemplary embodiment of the present invention, and FIG. 14 is a cross-sectional view taken along line XIV-XIV in the liquid crystal display of FIG. 13.

Referring to FIG. 12, as FIG. 3, a liquid crystal display according to an exemplary embodiment of the present invention includes a plurality of signal lines including the first and second gate lines GLa, GLb, and GLc adjacent to each other and the data line DL and the first pixel PX1 and the second pixel PX2 connected thereto. The first pixel PX1 and the second pixel PX2 are disposed adjacent to each other in the column direction of the pixel.

Each pixel PX includes the first, second, and third switching elements Qa, Qb, and Qc, the first and second liquid crystal capacitors Clca and Clcb, the first and second storage capacitors Csta and Cstb, and the step-down capacitor Cstd.

The first and second switching elements Qa and Qb of the first pixel PX1 are respectively connected to the first gate line GLa and the data line DL, and the third switching element Qc is connected to the second gate line GLb.

The first and second switching elements Qa and Qb are three terminal elements such as thin film transistors provided in the lower panel 100, and the first switching elements Qa has the control terminals connected to one of the first gates line GLa, the input terminals connected to the data line DL, and the output terminals connected to the first liquid crystal capacitor Clca and the first storage capacitor Csta.

The second switching element Qb has the control terminal connected to the first gate line GLa, the input terminal connected to the data line DL, and the output terminal connected to the second liquid crystal capacitor Clcb and the second storage capacitor Cstb.

The third switching element Qc is also a three terminal element such as a thin film transistor provided in the lower panel 100, the control terminal of which is connected to one of the second gate lines GLb, the input terminal of which is connected to the second liquid crystal capacitor Clcb, and the output terminal of which is connected to the step-down capacitor Cstd.

In the liquid crystal display of FIG. 12, differently form the liquid crystal display of the embodiment of FIG. 3, the step-down capacitor Cstd is connected to the output terminal of the third switching element Qc and the third gate line GLc, and is formed by overlapping the capacitor electrode (not shown) extended from the third gate line GLc and the output electrode of the third switching element Qc via the insulator.

Also, the third gate line GLc is connected to the input terminals of the first switching element Qa and the second switching element Qb of the other pixel neighboring the corresponding pixel PX in the column direction.

Referring to the operation of the liquid crystal display according to the present exemplary embodiment, if the first gate signal applied to the first gate line GLa is changed from the gate-off voltage Voff to the gate-on voltage Von, the first and second switching elements Qa and Qb connected thereto are turned on. Accordingly, the data voltage Vd applied to the data line DL is applied to the first and second sub-pixel electrodes PEa and PEb of the first pixel PX1 through the turned on first and second switching elements Qa and Qb. Here, the data voltages Vd applied to the first and second sub-pixel electrodes PEa and PEb of the first pixel PX1 are equal to each other. The first and second liquid crystal capacitors Clca and Clcb of the first pixel PX1 are charged with the same value as a difference between the common voltage and the data voltage Vd.

Thereafter, when the first gate signal shifts from the gate-on voltage Von to the gate-off voltage Voff, and simultaneously the second gate signal shifts from the gate-off voltage Voff to the gate-on voltage Von, the first and second switching elements Qa and Qb of the first pixel PX1 are turned off, while the first and second switching elements Qa and Qb of the second pixel PX2 are turned on. Thus, the data voltage Vd applied to the data line DL is applied to the first and second sub-pixel electrodes PEa and PEb of the second pixel PX2 through the turned on first and second switching elements Qa and Qb of the second pixel PX2.

Next, when the third gate signal is changed from the gate-on voltage Von to the gate-off voltage Voff, simultaneously the third gate signal applied to the second gate line GLb is changed from the gate-off voltage Voff to the gate-on voltage Von, the third switching element Qc of the first pixel PX1 is turned on. Thus, the charges are moved from the second sub-pixel electrode PEb of the first pixel PX1 through the third switching element Qc. Accordingly, the voltage charged at the second liquid crystal capacitor Clcb of the first pixel PX1 is lowered, and the step-down capacitor Cstd of the first pixel PX1 is charged. The voltage charged at the second liquid crystal capacitor Clcb of the first pixel PX1 is lowered by the capacitance of the step-down capacitor Cstd of the first pixel PX1 such that the voltage charged at the second liquid crystal capacitor Clcb of the first pixel PX1 is lower than that of the first liquid crystal capacitor Clca of the first pixel PX1.

Next, although not shown, like the above-described first pixel PX1, if the fourth gate line connected to the step-down capacitor Cstd of the second pixel PX2 is applied with the gate-on voltage, the third switching element Qc of the second pixel PX2 is turned on such that the charges are moved from the second sub-pixel electrode PEb of the second pixel PX2 through the third switching element Qc. Consequently, the voltage charged at the second liquid crystal capacitor Clcb of the second pixel PX2 is lowered, while the step-down capacitor Cstd of the second pixel PX2 is charged. The voltage charged at the second liquid crystal capacitor Clcb of the second pixel PX2 is lowered by the capacitance of the step-down capacitor Cstd of the second pixel PX2 such that the voltage charged at the second liquid crystal capacitor Clcb of the second pixel PX2 is lower than that of the first liquid crystal capacitor Clca of the second pixel PX2. The above-described steps may be repeated.

Next, the detailed structure of the liquid crystal display according to the exemplary embodiment of FIG. 12 will be described.

Referring to FIG. 13 and FIG. 14, the liquid crystal display according to the present exemplary embodiment includes a lower panel 100 and an upper panel 200, and a liquid crystal layer 3 interposed between the two display panels 100 and 200.

Firstly, the lower panel 100 will be described according to an embodiment.

A plurality of gate conductors including a plurality of first and second gate lines 121a and 121b, a plurality of third gate lines 121c, and a plurality of storage electrode lines 131 are formed on an insulation substrate 110. The first gate line 121a includes the first and second gate electrodes 124a and 124b, the second gate line 121b includes the third gate electrode 124c, and the third gate line 121c includes a capacitor electrode 127.

The storage electrode line 131 includes a plurality of protrusions forming a storage electrode 137.

A gate insulating layer 140 is formed on the gate conductors 121a, 121b, 121c, and 131. The first, second, and third semiconductors 154a, 154b, and 154c are formed on the gate insulating layer 140, and a plurality of first ohmic contacts (not shown), second ohmic contacts 163b and 165b, and third ohmic contacts 163c and 165c are formed thereon.

A data conductor including a plurality of data lines 171, a plurality of first, second, and third drain electrodes 175a, 175b, and 175c, and electrode members 177 are formed on the ohmic contacts 163b, 163c, 165b, and 165c, and the gate insulating layer 140.

Each data line 171 has a plurality of first and second source electrodes 173a and 173b, and a wide end portion (not shown) to be connected with other layers or external driving circuits. The data lines 171 do not extend in a straight line on the whole, but are bent at least twice. In detail, as shown in FIG. 13 according to an embodiment, the data lines 171 respectively include a first longitudinal portion 171a extending in the longitudinal direction, a first transverse portion 171c curved from the first longitudinal portion 171a in the rightward direction and extending in the transverse direction, a second longitudinal portion 171b curved downward from the first transverse portion 171c and extending in the longitudinal direction, and a second transverse portion 171d curved to the left side from the second longitudinal portion 171b and extending in the transverse horizontal direction. The first longitudinal portion 171a and the second longitudinal portion 171b of the data line 171 are disposed on imaginary straight lines that are respectively parallel to each other and separated from each other.

Each of the first and second drain electrodes 175a and 175b includes one end portion having a wide area, and the other end portion may have a bar shape. The portions of the bar end portions of the first and second drain electrodes 175a and 175b are enclosed by the first and second source electrode 173a and 173b. The second drain electrode 175b is extended thereby forming the third source electrode 173c. The third drain electrode 175c faces one end portion of the third source electrode 173c, and the other end portion of the third source electrode 173c is extended thereby forming an electrode member 177.

The first gate electrode 124a, the first source electrode 173a, and the first drain electrode 175a form the first thin film transistor Qa along with the first semiconductor 154a, and the channel of the thin film transistor is formed in the semiconductor 154a between the source electrode 173a and the drain electrode 175a. The second gate electrode 124b, the second source electrode 173b, and the second drain electrode 175b form the second thin film transistor Qb along with the second semiconductor 154b, and the third gate electrode 124c, the third source electrode 173c, and the third drain electrode 175c form the third thin film transistor Qc along with the third semiconductor 154c.

The semiconductors 154a, 154b, 154c, and 157 except for the channels according to the present exemplary embodiment have substantially the same planar shape as the data lines 171, the first to third drain electrodes 175a, 175b, and 175c, the electrode members 177, and the underlying ohmic contacts 163b, 163c, 165b, 165c, and 167. Also, the semiconductors have the exposed portions that are not covered by the data lines 171 and the drain electrodes 175a-c as well as a portion between the source electrodes 173a-c and the drain electrodes 175a-c.

A passivation layer 180 is formed on the data conductors 171, 173c, 175a, 175b, 175c, and 177, and the exposed semiconductors 154a, 154b, and 154c.

The passivation layer 180 has a plurality of contact holes 185a and 185b exposing the wide end portion of the first drain electrode 175a and the second drain electrode 175b, and a plurality of contact holes (not shown) exposing end portions of the data lines 171, and the passivation layer 180 and the gate insulating layer 140 have a plurality of contact holes (not shown) exposing the end portions of the gate lines 121.

A plurality of pixel electrodes 191 including the first and second sub-pixel electrode 191a and 191b, and a plurality of contact assistants (not shown) are formed on the passivation layer 180.

Each pixel electrode 191 may have an approximately quadrangle shape having four edges parallel to the gate lines 121a and 121b or the data lines 171 and 172. The portions of the oblique edges of the pixel electrode 191 may have a chamfered shape to have the angle of about 45° with respect to the gate lines 121a and 121b.

A pair of the first and second sub-pixel electrodes 191a and 191b forming one pixel electrode 191 engage with each other with a gap 95 disposed therebetween, and the first sub-pixel electrode 191a is interposed within the second sub-pixel electrode 191b. That is, the second sub-pixel electrode 191b encloses the first sub-pixel electrode 191a, and they are separated from each other by the gap 95 so as to not be overlapped to each other.

The second sub-pixel electrode 191b has upper cutouts 92a and 93a and lower cutouts 92b and 93b, and the second sub-pixel electrode 191b is divided into a plurality of regions by the cutouts 92a, 92b, 93a, and 93b. The cutouts 92a, 92b, 93a, and 93b have inversion symmetry with respect to the storage electrode line 131.

The upper and lower cutouts 92a, 92b, 93a, and 93b obliquely extend from the right edge of the pixel electrode 191 to the left edge, the upper edge, or the lower edge. The upper and lower cutouts 92a, 92b, 93a, and 93b are respectively disposed on the lower-half portion and the upper-half portion with respect to the storage electrode line 131. The upper and lower cutouts 92a, 92b, 93a, and 93b are inclined with respect to the gate line 121 by an angle of about 45°, and extend perpendicularly to each other.

Accordingly, the lower-half portion of the pixel electrode 191 is divided into four regions by the gaps 95 and the lower cutouts 92b and 93b, and the upper-half portion thereof is divided into four regions by the gaps 95 and the upper cutouts 92a and 93a. Here, the number of regions or cutouts may vary depending on design factors, such as the size of the pixel electrode 191, the length ratio of the horizontal side and the vertical side of the pixel electrode 191, the type of liquid crystal layer 3, or other characteristics.

The oblique portions of the cutouts 92a, 92b, 93a, and 93b include notches with a triangular shape. The notches may have, for example, a quadrangular, a trapezoidal, or a semicircular shape, and may be convex or concave. These cutouts 92a, 92b, 93a, and 93b determine the arrangement direction of the liquid crystal molecules 31 disposed on the corresponding regions.

The first and second sub-pixel electrodes 191a and 191b are respectively physico-electrically connected to the first and second drain electrodes 175a and 175b through the contact holes 185a and 185b to respectively receive data voltages therefrom. Also, the second sub-pixel electrode 191b is physico-electrically connected to the third source electrode 173c through the contact hole 185c.

The first and second sub-pixel electrodes 191a and 191b generate electric fields in association with the common electrode 270 of the common electrode display panel 200, thereby determining the alignment directions of the liquid crystal molecules 31 of the liquid crystal layer 3 between the two electrodes 191 and 270. The polarization of light passing through the liquid crystal layer 3 is differentiated depending upon the determined alignment directions of the liquid crystal molecules 31. The pixel electrode 191 and the common electrode 270 form a liquid crystal capacitor to store voltages applied thereto even after the thin film transistor turns off.

The pixel electrodes 191 overlap the storage electrode lines 131. The pixel electrode 191 is overlapped with the storage electrode lines 131 so as to form a storage capacitor, which reinforces the voltage storage capacity of the liquid crystal capacitor.

The capacitor electrode 127 and the electrode member 177 of the third drain electrode 175c are overlapped with each other by interposing a gate insulating layer 140 so as to form a step-down capacitor Cstd.

As described above, with a liquid crystal display according to an exemplary embodiment of the present invention, the step-down capacitor Cstd is formed using the capacitor electrode 127 extended from the third gate line 121c without providing a separate capacitor electrode line and a separate capacitor electrode so that the aperture ratio can be enhanced compared to the case where a separate capacitor electrode line and a separate capacitor electrode are provided to form the step-down capacitor Cstd.

The upper display panel 200 will now be described in detail according to one or more embodiments.

A light blocking member 220 is formed on an insulation substrate 210. A plurality of color filters 230 are formed on the insulation substrate 210. The color filters 230 mostly exist within the area surrounded by the light blocking member 220, and may longitudinally extend along the columns of the pixel electrodes 191 in the longitudinal direction. An overcoat 250 is formed on the color filters 230 and the light blocking member 220. The common electrode 270 is formed on the overcoat 250. A plurality of sets of cutouts 71, 72, 73a, 73b, 74a, and 74b are formed at the common electrode 270.

One set of cutouts 71-74b faces one pixel electrode 191, and includes first and second central cutouts 71 and 72, upper cutouts 73a and 74a, and lower cutouts 73b and 74b. Each of the cutouts 71-74b is disposed between the neighboring cutouts 92a-93b of the pixel electrode 191. Also, each of the cutouts 71-74b includes at least one oblique branch parallel to the upper cutouts 92a and 93a or the lower cutouts 92b and 93b of the pixel electrode 191.

The upper and lower cutouts 73a-74b respectively include an oblique branch, a transverse branch, and a longitudinal branch. The oblique branch substantially extends from the right edge of the pixel electrode 191 to the left, upper, or lower edge and parallel to the upper or lower cutouts 92a-93b of the pixel electrode 191. The transverse branch and the longitudinal branch extend from each end of the oblique branch while overlapping the edge of the pixel electrode 191, and form an obtuse angle with the oblique branch.

The first and second central cutouts 71 and 72 include a central transverse branch, a pair of oblique branches, and a pair of end longitudinal branches. The central transverse branch extends approximately from the right edge of the pixel electrode 191 to the left side according to the transverse central line of the pixel electrode 191, and a pair of oblique branches extend from the central transverse branch toward the left edge of the pixel electrode 191 and approximately parallel to the upper and lower cutouts 73a, 73b, 74a, and 74b. The end longitudinal branches extend from each end of the oblique branches while overlapping the left edge of the pixel electrode 191 and form an obtuse angle with the oblique branch.

The oblique portions of the cutouts 71-74b include notches with a triangular shape. The notches may have a quadrangular, a trapezoidal, or a semicircular shape, for example.

The number and direction of the cutouts 71-74b may be changed according to design factors.

If the common electrode 270 is applied with the common voltage and the pixel electrode 191 is applied with the data voltage, an electric field substantially perpendicular to the surface of the display panels 100 and 200 is formed. Thus, liquid crystal molecules 31 of the liquid crystal layer 3 change directions so that the major axes thereof become perpendicular to the direction of the electric field in response to the electric field. Hereinafter, both the pixel electrode 191 and the common electrode 270 are commonly referred to as "field generating electrodes".

On the other hand, the cutouts 92a, 92b, 93a, and 93b of the pixel electrode and the cutouts 71-74b of the common electrode, and the oblique edges of the pixel electrode 191 parallel to them, distort the electric field to have a horizontal component that determines the tilt directions of the liquid crystal molecules 31. The horizontal component of the main electric field is perpendicular to the oblique edges of the cutouts 92a-93b and 71-74b, and the oblique edges of the pixel electrodes 191.

One cutout set 71-74b of the common electrode and one cutout set 92a-93b of the pixel electrode divide the pixel electrode 191 into a plurality of subregions, and each of the subregions has two major edges forming the oblique angle with the main edges of the pixel electrode 191. Since the liquid crystal molecules on each subregion tilt perpendicular to the major edges, the azimuthal distribution of the tilt directions are localized to four directions. In this way, the reference viewing angle of the liquid crystal display is increased by making the tilt directions of the liquid crystal molecules variable.

At least one cutout 92a-93b and 71-74b may be replaced with a protrusion or a depression, and the shape and disposition of the cutouts 92a-93b and 71-74b may be modified.

While this disclosure has been described in connection with what is presently considered to be practical exemplary embodiments, it is to be understood that the disclosure is not limited to the disclosed embodiments, but, on the contrary, is intended to cover various modifications and equivalent arrangements included within the spirit and scope of the appended claims.

What is claimed is:

1. A liquid crystal display including a plurality of pixels arranged in a matrix, the liquid crystal display comprising:
    a pixel electrode respectively including a first sub-pixel electrode and a second sub-pixel electrode;
    a first thin film transistor connected to the first sub-pixel electrode;
    a second thin film transistor connected to the second sub-pixel electrode;
    a third thin film transistor connected to the second sub-pixel electrode;
    a first gate line connected to the first and second thin film transistors;
    a data line connected to the first and second thin film transistors;
    a second gate line connected to the third thin film transistor; and
    a step-down capacitor electrically connected to both a drain electrode of the third thin film transistor and the first gate line.

2. The liquid crystal display of claim 1, wherein
    the step-down capacitor is formed by overlapping the first gate line and an electrode member via a first insulating layer, and
    the electrode member is formed with the same layer as the data line.

3. The liquid crystal display of claim 2, wherein
    the electrode member is connected to the drain electrode of the third thin film transistor.

4. The liquid crystal display of claim 2, wherein
    the step-down capacitor further includes a semiconductor layer disposed under the electrode member, and
    the electrode member has substantially the same plane shape as the semiconductor layer.

5. The liquid crystal display of claim 1, further comprising
    a second insulating layer formed between the first, second, and third thin film transistors, and the first and second sub-pixel electrodes,
    wherein the second insulating layer has a first contact hole to connect the first thin film transistor to the first pixel electrode and a second contact hole to connect the second thin film transistor to the second pixel electrode, and
    wherein the first contact hole is disposed in the region enclosed by the source electrode of the first thin film transistor, and the second contact hole is disposed in a region enclosed by the source electrode of the second thin film transistor.

6. The liquid crystal display of claim 1, wherein
    the step-down capacitor is formed by overlapping the first gate line and the electrode member via the insulating layer, and
    the electrode member is formed with the same layer as the pixel electrode.

7. The liquid crystal display of claim 6, further comprising
    semiconductor layers formed under the first thin film transistor, the second thin film transistor, the drain electrode of the third thin film transistor, and the data line,
    wherein the semiconductor layers have substantially the same plane shape as the first thin film transistor, the second thin film transistor, the drain electrode of the third thin film transistor, and the data line except for the channel of the first, second, and third thin film transistors.

8. The liquid crystal display of claim 6, wherein
    the insulating layer has a contact hole, and
    the electrode member is connected to the drain electrode of the third thin film transistor through the contact hole.

9. The liquid crystal display of claim 1, wherein
    the first sub-pixel electrode and the second sub-pixel electrode are adjacent to each other according to a pixel column of the pixels.

10. The liquid crystal display of claim 1, further comprising
    a common electrode facing the pixel electrode,
    wherein at least one of the first sub-pixel electrode and the second sub-pixel electrode has a first cutout, and
    the common electrode has a second cutout.

11. A liquid crystal display including a plurality of pixels arranged in a matrix, the liquid crystal display comprising:
- a pixel electrode respectively including a first sub-pixel electrode and a second sub-pixel electrode;
- a first thin film transistor connected to the first sub-pixel electrode;
- a second thin film transistor connected to the second sub-pixel electrode;
- a third thin film transistor connected to the second sub-pixel electrode;
- a first gate line connected to the first and second thin film transistors;
- a data line connected to the first and second thin film transistors;
- a second gate line connected to the third thin film transistor; and
- a step-down capacitor electrically connected to both a drain electrode of the third thin film transistor and a third gate line.

12. The liquid crystal display of claim 11, wherein
the step-down capacitor is formed by overlapping the third gate line and an electrode member via a first insulating layer, and
the electrode member is formed with the same layer as the data line.

13. The liquid crystal display of claim 12, wherein
the electrode member is connected to the drain electrode of the third thin film transistor.

14. The liquid crystal display of claim 12, wherein
the step-down capacitor further includes a semiconductor layer disposed under the electrode member, and
the electrode member has substantially the same plane shape as the semiconductor layer.

15. The liquid crystal display of claim 11, wherein
the step-down capacitor is formed by overlapping the third gate line and the electrode member via the first insulating layer, and
the electrode member is formed with the same layer as the pixel electrode.

16. The liquid crystal display of claim 15, further comprising
semiconductor layers formed under the first thin film transistor, the second thin film transistor, the drain electrode of the third thin film transistor, and the data line,
wherein the semiconductor layers have substantially the same plane shape as the first thin film transistor, the second thin film transistor, the drain electrode of the third thin film transistor, and the data line except for the channel of the first, second, and third thin film transistors.

17. The liquid crystal display of claim 15, wherein
the insulating layer has a first contact hole, and
the electrode member is connected to the drain electrode of the third thin film transistor through the first contact hole.

18. The liquid crystal display of claim 11, wherein
the second sub-pixel electrode encloses the first sub-pixel electrode.

19. The liquid crystal display of claim 18, wherein
the area of the first sub-pixel electrode is smaller than the area of the second sub-pixel electrode.

20. The liquid crystal display of claim 18, further comprising
a common electrode facing the pixel electrode,
wherein at least one of the first sub-pixel electrode and the second sub-pixel electrode has a first cutout, and
the common electrode has a second cutout.

* * * * *